US011347208B2

(12) United States Patent
Fadul et al.

(10) Patent No.: US 11,347,208 B2
(45) Date of Patent: May 31, 2022

(54) ETHERNET I/O CARD SCANNER

(71) Applicant: FISHER-ROSEMOUNT SYSTEMS, INC., Round Rock, TX (US)

(72) Inventors: Camilo Fadul, Round Rock, TX (US); Aaron C. Jones, Austin, TX (US); Christopher Cho, Round Rock, TX (US)

(73) Assignee: FISHER-ROSEMOUNT SYSTEMS, INC., Round Rock, TX (US)

( * ) Notice: Subject to any disclaimer, the term of this patent is extended or adjusted under 35 U.S.C. 154(b) by 138 days.

(21) Appl. No.: 16/861,567

(22) Filed: Apr. 29, 2020

(65) Prior Publication Data
US 2021/0341907 A1    Nov. 4, 2021

(51) Int. Cl.
*G05B 19/418* (2006.01)
*G06F 13/20* (2006.01)

(52) U.S. Cl.
CPC ..... *G05B 19/4185* (2013.01); *G05B 19/4183* (2013.01); *G05B 19/4184* (2013.01); *G05B 19/41845* (2013.01); *G05B 19/41885* (2013.01); *G06F 13/20* (2013.01)

(58) Field of Classification Search
CPC .. G05B 19/4185; G05B 19/4183; G06F 13/20
See application file for complete search history.

(56) References Cited

U.S. PATENT DOCUMENTS

| 4,217,647 A | 8/1980 | Sjoholm et al. |
| 6,711,629 B1 | 3/2004 | Christensen et al. |
| 7,835,295 B2 | 11/2010 | Brewer et al. |
| 8,442,663 B2 | 5/2013 | Aneweer et al. |
| 8,762,618 B2 | 6/2014 | Burr et al. |
| 9,083,548 B2 | 7/2015 | Holmes et al. |
| 9,130,980 B2 | 9/2015 | Law et al. |
| 9,411,769 B2 | 8/2016 | Erni et al. |
| 9,495,313 B2 | 11/2016 | Burr et al. |
| 10,528,037 B2 | 1/2020 | Jundt et al. |
| 2003/0023795 A1 | 1/2003 | Packwood et al. |

(Continued)

FOREIGN PATENT DOCUMENTS

WO    WO-2017066308 A1    4/2017

OTHER PUBLICATIONS

DeltaV Distributed Control System, "Ethernet I/O Card (EIOC)". Retrieved from the Internet at: <https://www.emerson.com/documents/automation/s-series-ethernet-i-o-card-en-57652.pdf> (2020).

(Continued)

*Primary Examiner* — Getente A Yimer
(74) *Attorney, Agent, or Firm* — Marshall, Gerstein & Borun LLP

(57) ABSTRACT

An Ethernet I/O card (EIOC) scanner device facilitates configuration of a process control system to enable improved integration of EIOC-enabled field devices (and associated field device variables) into the process control system. Specifically, the EIOC scanner may: (i) analyze decoder files for EIOC-enabled field devices to automatically identify field device variables that the EIOC-enabled field devices are configured to transmit or receive; and (ii) quickly and easily facilitate a configuration of the process control system to integrate into the process control system the EIOC-enabled field devices and any associated field device variables identified by the EIOC scanner.

20 Claims, 13 Drawing Sheets

(56) References Cited

U.S. PATENT DOCUMENTS

| | | | |
|---|---|---|---|
| 2004/0153594 | A1 | 8/2004 | Rotvold et al. |
| 2005/0066104 | A1 | 3/2005 | Train et al. |
| 2008/0162738 | A1 | 7/2008 | Apel et al. |
| 2012/0249349 | A1 | 10/2012 | Sasaki et al. |
| 2018/0231959 | A1 | 8/2018 | Jundt et al. |
| 2020/0103946 | A1 | 4/2020 | Law et al. |

OTHER PUBLICATIONS

DeltaV Distributed Control System, DeltaV™ CHARMs Commissioning, Retrieved from the Internet at: <http://www.emerson.com/documents/automation/deltav-charm-commissioning-en-56728.pdf> May 17, 2018.

DeltaV Distributed Control System, DeltaV™ IS Electronic Marshalling, Retrieved from the Internet at: <http://www.emerson.com/documents/automation/deltav-electronic-marshalling-en-57016.pdf> Jun. 6, 2018.

DeltaV™ DeltaV Distributed Control System, DeltaV Electronic Marshalling, Retrieved from the Internet at: <http://www.emerson.com/documents/automation/deltav-electronic-marshalling-en-56832.pdf> May 17, 2018.

DeltaV™ Distributed Control System, "Improve Operation Performance with DeltaV Alarm Mosaic and Advanced Alarm Management". Retrieved from the Internet at: <https://partners.decisionbriefs.com/emr/files/post attachment/238.pdf> (2020).

DeltaV™, DeltaV Distributed Control System, Smart Commissioning, Retrieved from the Internet at:<http://www2.emersonprocess.com/siteadmincenter/PM%20DeltaV%20Documents/Whitepapers/dv_wp_SmartCommissioning.pdf> Jun. 6, 2018.

DeltaV™, Function Block Reference, Retrieved from the Internet at: <https://docuri.com/queue/deltav-function_59a8d6f5f581719e12adcf16_pdf?queue id=59c9f76ef58171c60328bb9d> Jun. 6, 2018.

DeltaV™, White Paper, "Simplify Commissioning to Shorted Project Timelines", Retrieved from the Internet at: <http://docplayer.net/22962420-White-paper-simplify-commissioning-to-shorten-project-timelines.html> Jun. 6, 2018.

PutmanMedia®, I/O at Your Fingertips, Retrieved from the Internet at: <http://www2.emersonprocess.com/siteadmincenter/PM%20Articles/IO-at-Your-Fingertips.pdf> Jun. 6, 2018.

Search Report for Application No. GB1913735.5, dated Mar. 6, 2020.

U.S. Appl. No. 16/452,129, Implementing and Configuring a Universal I/O Card for a Process Control I/O Network, filed Jun. 25, 2019.

Search Report for Application No. GB2105634.6, dated Feb. 10, 2022.

| Commonly used public function codes ||||
|---|---|---|---|
| Code | Hex | Function | Type |
| 01 | 01 | Read Coils | Single Bit Access / Data Access |
| 02 | 02 | Read Discrete Inputs | Single Bit Access / Data Access |
| 05 | 05 | Write Single Coil | Single Bit Access / Data Access |
| 15 | 0F | Write Multiple Coils | Single Bit Access / Data Access |
| 03 | 03 | Read Holding Registers | 16 bit Access / Data Access |
| 04 | 04 | Read Input Registers | 16 bit Access / Data Access |
| 06 | 06 | Write Single Register | 16 bit Access / Data Access |
| 16 | 10 | Write Multiple Registers | 16 bit Access / Data Access |
| 22 | 16 | Mask Write Register | 16 bit Access / Data Access |
| 23 | 17 | Read/Write Multiple Registers | 16 bit Access / Data Access |
| 24 | 18 | Read FIFO queue | 16 bit Access / Data Access |
| 20 | 14 | Read FIle Record | File record access / Data Access |
| 21 | 15 | Write FIle Record | File record access / Data Access |
| 07 | 07 | Read Exception Status | Diagnostics |
| 08 | 08 | Diagnostic | Diagnostics |
| 11 | 0B | Get Com event counter | Diagnostics |
| 12 | 0C | Get Com Event Log | Diagnostics |
| 17 | 11 | Report Server ID | Diagnostics |

ETHERNET I/O CARD SCANNER

TECHNICAL FIELD

The present disclosure generally relates to Ethernet Input/Output (I/O) Cards (EIOCs) in process control environments, and, more particularly, to a scanner device that enables improved configuration of process control systems based on decoder files for EIOC-enabled field devices.

BACKGROUND

Distributed process control systems, such as distributed or scalable process control systems like those used in power generation, chemical, petroleum, or other processes, typically include one or more process controllers communicatively coupled to each other, to at least one host or operator workstation via a process control network, and to one or more instrumentation or field devices via analog, digital, or combined analog/digital buses.

The field devices perform functions within the process or plant such as opening or closing valves, switching devices on and off, and measuring process parameters. Example field devices include valves, valve positioners, switches, and transmitters (e.g., devices including sensors for measuring temperature, pressure, or flow rate; and transmitters for transmitting the sensed temperatures, pressures, and flow rates).

The process controllers, which are typically located within the plant environment, receive signals indicative of process measurements made by the field devices (or other information pertaining to the field devices) and execute a controller application that runs, for example, different control modules which make process control decisions, generate control signals based on the received information, and coordinate with the control modules or blocks being implemented in smart field devices (e.g., HART®, WirelessHART®, and FOUNDATION® Fieldbus field devices).

Execution of the control modules causes the process controllers to send the control signals over the communication links or signal paths to the field devices, to thereby control the operation of at least a portion of the process plant or system (e.g., to control at least a portion of one or more industrial processes running or executing within the plant or system). For example, a first set of controller(s) and field devices may control a first portion of a process being controlled by the process plant or system, and a second set of controller(s) and field devices may control a second portion of the process.

Input/output (I/O) cards (sometimes called "I/O devices" or "I/O modules"), which are also typically located within the plant environment, typically are communicatively disposed between a controller and one or more field devices, enabling communications there between (e.g. by converting electrical signals into digital values and vice versa). Typically, an I/O card functions as an intermediary node between a process controller and one or more field devices inputs or outputs configured for the same communication protocol or protocols as those utilized by the I/O card. Specifically, field device inputs and outputs are typically configured for either analog or discrete communications. In order to communicate with a field device, a controller generally needs an I/O card configured for the same type of input or output utilized by the field device. That is, for a field device configured to receive analog control output signals (e.g., a 4-20 mA signal), the controller needs an analog output (AO) I/O card to transmit the appropriate analog control output signal; and for a field device configured to transmit measurements or other information via an analog signal, the controller typically needs an analog input (AI) card to receive the transmitted information. Similarly, for a field device configured to receive discrete control output signals, the controller needs a discrete output (DO) I/O card to transmit the appropriate discrete control output signal; and for a field device configured to transmit information via a discrete control input signal, the controller needs a discrete input (DI) I/O card. Further, some I/O cards are configured for resistance temperature detectors (RTD) (which vary the resistance of the wire with temperature) or thermocouples (TC) (which generate a voltage proportional to a temperature). Generally, each I/O card can connect to multiple field device inputs or outputs, wherein each communication link to a particular input or output is referred to as an "I/O channel" (or, more generically, "channel"). For example, a 120 channel DO I/O card can be communicatively connected to 120 distinct discrete field device inputs via 120 distinct DO I/O channels, enabling the controller to transmit (via the DO I/O card) discrete control output signals to the 120 distinct discrete field device inputs.

As utilized herein, field devices, controllers, and I/O devices are generally referred to as "process control devices," and are generally located, disposed, or installed in a field environment of a process control system or plant. The network formed by one or more controllers, the field devices communicatively connected to the one or more controllers, and the intermediary nodes facilitating communication between the controllers and field devices may be referred to as an "I/O network" or "I/O subsystem."

Information from the I/O network(s) may be made available over a data highway or communication network (the "process control network") to one or more other hardware devices, such as operator workstations, personal computers or computing devices, handheld devices, data historians, report generators, centralized databases, or other centralized administrative computing devices that are typically placed in control rooms or other locations away from the harsher field environment of the plant, e.g., in a back-end environment of the process plant.

The information communicated over the process control network enables an operator or a maintenance person to perform desired functions with respect to the process via one or more hardware devices connected to the network. These hardware devices may run applications that enable an operator to, e.g., change settings of the process control routine(s), modify the operation of the control modules within the process controllers or the smart field devices, view the current state of the process or status of particular devices within the process plant, view alarms generated by field devices and process controllers, simulate the operation of the process for the purpose of training personnel or testing the process control software, diagnose problems or hardware failures within the process plant, etc. The process control network or data highway utilized by the hardware devices, controllers, and field devices may include a wired communication path, a wireless communication path, or a combination of wired and wireless communication paths.

As an example, the DeltaV™ control system and Ovation™ distributed control system (DCS) sold by Emerson each includes multiple applications stored within and executed by different devices located at diverse places within a process plant. A configuration application, which resides in one or more workstations or computing devices in a back-end environment of a process control system or plant, enables users to create or change process control modules and download these process control modules via a data highway to dedicated distributed controllers. Typically, these control modules are made up of communicatively interconnected function blocks, which are objects in an object-oriented programming protocol that (i) perform functions within the control scheme based on inputs thereto and (ii) provide outputs to other function blocks within the control scheme. The configuration application may also allow a configuration designer to create or change operator interfaces which are used by a viewing application to display data to an operator and to enable the operator to change settings, such as set points, within the process control routines.

Each dedicated controller (and, in some cases, one or more field devices) stores and executes a respective controller application that runs the control modules assigned and downloaded thereto to implement actual process control functionality. The viewing applications, which may be executed on one or more operator workstations (or on one or more remote computing devices in communicative connection with the operator workstations and the data highway), receive data from the controller application via the data highway and display this data to process control system designers, operators, or users using the user interfaces, and may provide any of a number of different views, such as an operator's view, an engineer's view, a technician's view, etc. A data historian application is typically stored in and executed by a data historian device that collects and stores some or all of the data provided across the data highway while a configuration database application may run in a still further computer attached to the data highway to store the current process control routine configuration and data associated therewith. Alternatively, the configuration database may be located in the same workstation as the configuration application.

In addition to process controllers, I/O cards, and field devices, a typical process control system includes many other supporting devices which are also necessary for, or related to, process operation. These additional devices include, for example, power supply equipment, power generation and distribution equipment, rotating equipment such as turbines, etc., which are located at numerous places in a typical plant.

Note, this background description provides context to facilitate understanding and appreciating the detailed description below. Work of the presently named inventors, to the extent described in this background section (as well as aspects of the background description that may not otherwise qualify as prior art at the time of filing) are neither expressly nor impliedly admitted as prior art against the present disclosure.

SUMMARY

This disclosure describes, with reference to FIGS. 1-12, various techniques, systems, and methods for facilitating configuration of a process control system to enable improved integration of EIOC-enabled field devices, and associated field device variables, into the process control system. Specifically, this disclosure describes an EIOC scanner that can: (i) analyze decoder files for EIOC-enabled field devices to automatically identify field device variables (sometimes "field device parameters") that the EIOC-enabled field devices are configured to transmit or receive; and (ii) quickly and easily facilitate a configuration of the process control system to integrate into the process control system the EIOC-enabled field devices and any desired field device variables, associated with the EIOC-enabled field devices, identified by the EIOC scanner.

In an embodiment, an electronic device for configuring an ethernet I/O card in a process control environment (sometimes called an "EIOC scanner") may include a process, a communication interface, and a memory storing machine-readable instructions that cause the processor to implement one or more operations. The one or more operations may include any one or more of: (i) an operation to analyze a decoder file, for a field device configured to be coupled via an ethernet link to an ethernet I/O card (EIOC) in a process control system, mapping one or more field device variables to one or more message positions; (ii) an operation to generate a dataset including one or more device signal tags (DSTs), each representing a process variable corresponding to a different one of the one or more field device variables, mapped to the one or more message positions; and (iii) an operation to upload, via the communication interface, the dataset to a configuration database for the process control system to include the dataset so that, when the process control system is configured according to the configuration database, the one or more DSTs correspond to the one or more message positions.

In an embodiment, the dataset is uploaded to the configuration database such that, when the process control system is configured according to the configuration database, the EIOC is configured to implement a controller output handling function or a controller input handling function. When configured for the controller output handling function, the EIOC is configured to map DST values from a controller output message to message positions in a field device input message for corresponding field device variables (the appropriate message positions may be determinable from decoder file). Performing this mapping may include: (1) receiving, from a process controller, a controller output message including a controller output value for a first DST, and (2) responding by assigning the controller output value to a first message position mapped, according to the dataset, to the first DST, such that the controller output value is transmitted from the EIOC to the field device at the first message position for a field device input message transmitted to the field device.

Similarly, when configured for the controller input handling function, the EIOC is configured to map field device variable values from a field device output message (received from a field device) to message positions in a controller input message (to be sent to a process controller) for corresponding DSTs (the appropriate message positions may be determinable from decoder file). Performing this mapping may include: (1) receiving, from the field device, a field device output message including a controller input value (also a "field device output value") at a second message position that is mapped, according to the dataset, to a second DST, and (2) responding by assigning the controller input value to the second DST, such that the input value is transmitted from the EIOC to the process controller as a value for the second DST as part of a controller input message.

In an embodiment, the EIOC may be configured to implement both the controller output handling function and the controller input handling function. The EIOC may be configured to transmit the controller input message and the field device input message such that each is transmitted during a different predetermined time slot. Further, the controller input/output messages and the field device input/output message may each carry multiple parameter values.

In an embodiment, the dataset generated by the electronic device based on the decoder file may include any desired type of system tag, including any one or more of DSTs, physical device tags (PDTs), logical device tags (LDTs), or node tags (representing a particular EIOC).

In an embodiment, the electronic device may present a user interface for adding, editing, or viewing the DSTs and any other system tags (and any associated properties) included in the dataset generated from the decoder file. In an embodiment, the electronic device may download the decoder file from the field device associated with the decoder file. In some instances, the electronic device may download the decoder file from a server (e.g., associated with a manufacturer of the field device).

Note, this summary has been provided to introduce a selection of concepts further described below in the detailed description. As explained in the detailed description, certain embodiments may include features and advantages not described in this summary, and certain—embodiments may omit one or more features or advantages described in this summary.

BRIEF DESCRIPTION OF THE DRAWINGS

Each of the figures described below depicts one or more aspects of the disclosed system(s) or method(s), according to an embodiment. The detailed description refers to reference numerals included in the following figures.

FIG. 7 depicts function codes commonly used for messages transmitted according to the Modbus/TCP protocol shown in FIG. 6.

DETAILED DESCRIPTION

As noted, this disclosure describes, with reference to FIGS. 1-12, various techniques, systems, and methods for facilitating configuration of a process control system to enable improved integration of EIOC-enabled field devices, and associated field device variables, into the process control system. FIGS. 1A and 1B, in particular, depict an EIOC scanner 75 (sometimes "scanner 75" or "device 75") that can: (i) analyze decoder files for EIOC-enabled field devices to automatically identify field device variables (sometimes "field device parameters") that the EIOC-enabled field devices are configured to transmit or receive; and (ii) quickly and easily facilitate a configuration of the process control system to integrate into the process control system the EIOC-enabled field devices and any desired field device variables, associated with the EIOC-enabled field devices, identified by the EIOC scanner 75.

The description below is divided into the following sections. Sections I describes, with reference to FIGS. 1A-4, example systems, devices, and networks associated with the disclosed techniques, including an example process control system that may be configured, using the EIOC scanner 75, to integrate into the process control system EIOC-enabled field devices and associated field device variables. Section II describes, with reference to FIG. 5, an example method for facilitating configuration of a process control system to integrate an EIOC-enabled field device, and associated variables, into the process control system. Section III describes, with reference to FIGS. 6-9, example protocol stacks associated with EIOC-enabled field devices and EIOCs that may be configured using the EIOC scanner 75. Section IV describes, with reference to FIGS. 10-12, example user interfaces (UIs) that may be presented by the EIOC scanner 75 to enable a user to add, edit, or view information associated with parameters to be added to the process control system based on the analysis of a decoder file. Sections V and VI describe additional considerations, as well as terms and phrases used in the specification.

I. AN EXAMPLE EIOC SCANNER 75 AND AN EXAMPLE PROCESS CONTROL SYSTEM 5

Figure 1A:
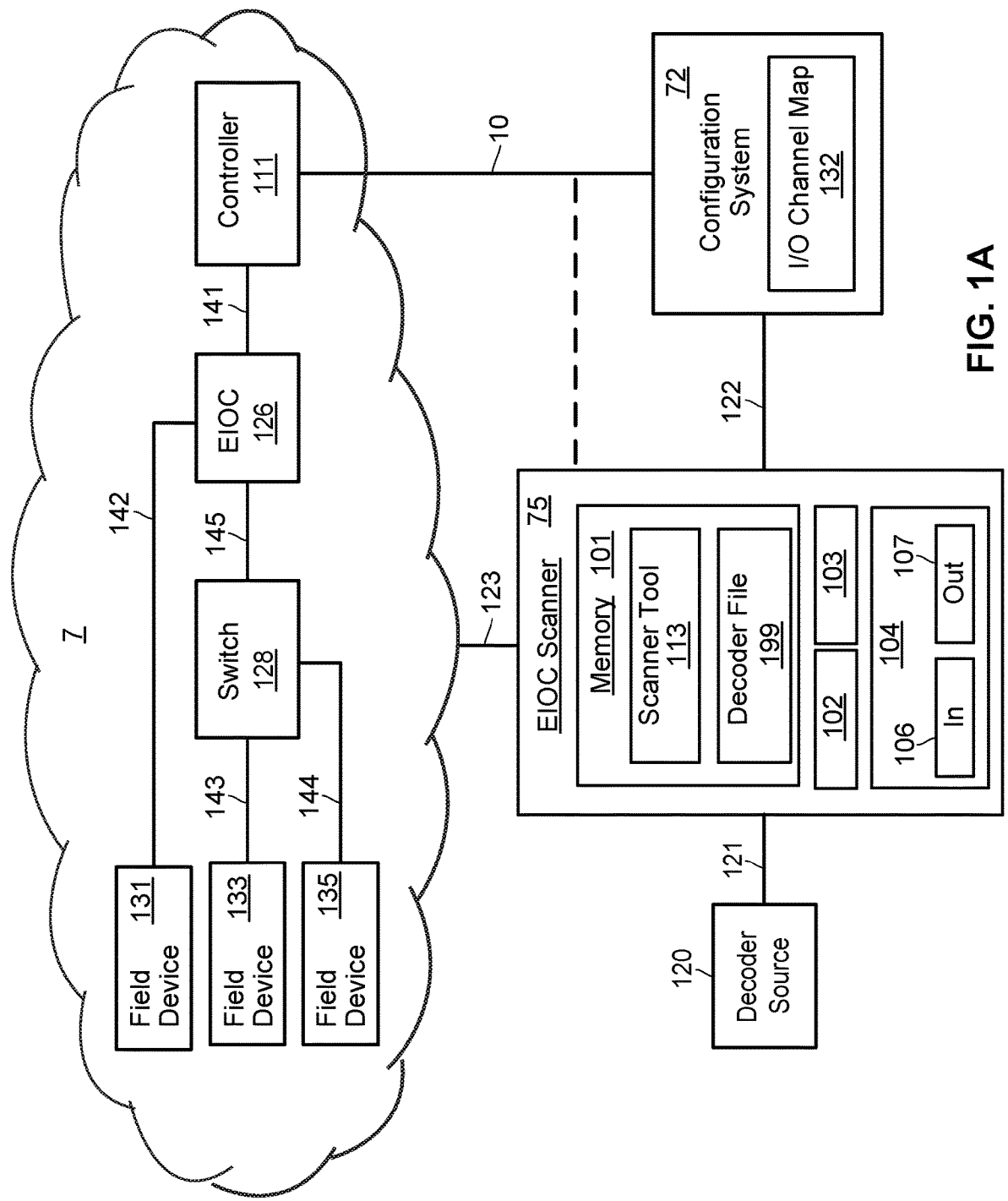
FIG. 1A is a block diagram of an Ethernet I/O card ("EIOC") network including an EIOC field device and an EIOC scanner.
Figure 1B:
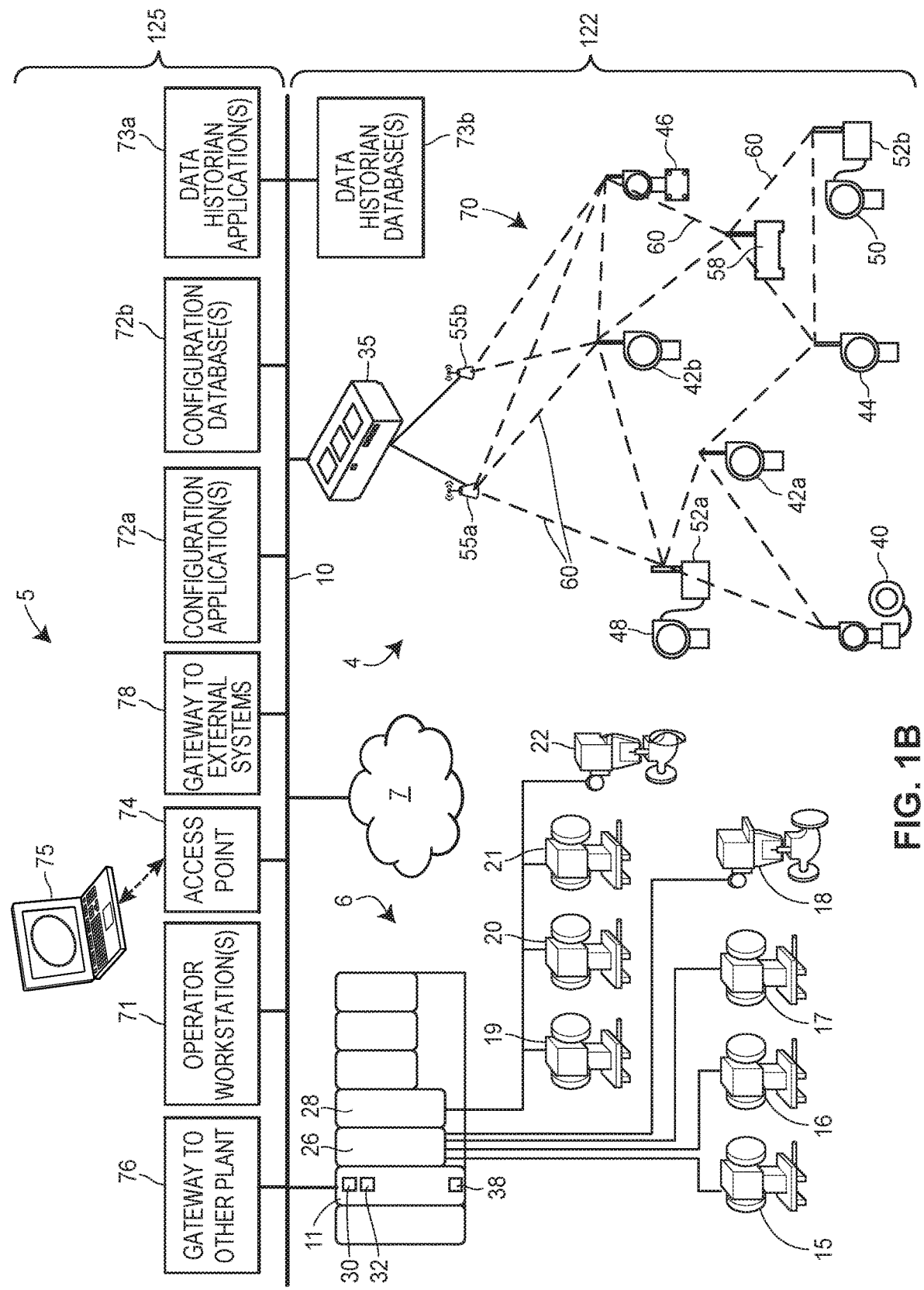
FIG. 1B is a block diagram of a process control system 5, of which the EIOC network shown in FIG. 1A may be a part.

FIG. 1A is a block diagram of an Ethernet I/O card ("EIOC) network 7 including an EIOC field device 131 and the scanner 75. FIG. 1B is a block diagram of a process control system 5, of which the EIOC network 7 may be a part. At a high level, the scanner 75 may: (i) analyze a decoder file 199 for the field device 131 to automatically identify field device variables that the field device 131 is configured to transmit or receive; and (ii) quickly and easily facilitate a configuration of the EIOC network 7 (and of the broader process control system 5, if desired) to integrate, into the EIOC network 7 or process control system 5, the field device 131 and any desired field device variables associated with the field device 131.

Generally speaking, the EIOC-compatible controllers and field devices disclosed herein communicate utilizing EIOC messages. An "EIOC message" is a network message (e.g., packet or frame) formatted according an EIOC stack of protocols. An "EIOC stack" refers to any suitable stack of communication protocols including to standard process control communication protocols that are encapsulated within packets transmissible according to standard Internet Protocol suite standards (e.g., Ethernet, TCP/IP, UDP/IP, etc.). Example EIOC protocols or stacks include the Common Industrial Protocol (CIP), EthernetIP, and Modbus TCP.

As an example, a typical "EIOC message" may be a process control message configured according to Modbus TCP standards, EthernetIP standards, or IEC standards at the application, presentation, and session layers of the OSI model. The process control message may be encapsulated within a User Datagram Protocol (UDP) or Transmission Control Protocol (TCP) packet at the transport layer of the OSI model, which may in turn be encapsulated within an IP packet at the network layer of the OSI model. Finally, the IP packet of the EIOC message may be encapsulated according to Ethernet standards at the data link and physical layers of the OSI model.

The term "Ethernet" refers to a family of computer networking technologies commonly used in local area networks (LANs) and wide area networks (WANs). At the physical layer, Ethernet may use coaxial cable, twisted pair (e.g., any suitable CATX cabling such as CAT5 or CAT6), or fiber optic links as a shared medium. These physical links may terminate using any suitable connector, such as an RJ45 connector. At the physical and data link layer, Ethernet communications generally conform with IEEE 802.3 standards. Generally speaking, systems communicating according to Ethernet standards (e.g., the EIOC controllers and field devices disclosed herein) divide a stream of data into shorter pieces called "frames." Typically, each frame contains source and destination addresses, and error-checking data so that damaged frames can be detected and discarded; most often, higher-layer protocols trigger retransmission of lost frames.

Regarding the phrases "EIOC" and "I/O," in the process control industry, the term "I/O" (as in "ethernet I/O card") may be used in a number of related but different contexts. The term "I/O" generally refers to a logical link or communication channel that communicatively couples a field device to an I/O card or controller (e.g., "I/O channel"), but may be used when referring to a number of other concepts, such as the devices that transmit signals to or receive signals from field devices via I/O channels (e.g., "I/O devices," "I/O cards," or "I/O modules"), connectors or terminals associated with the I/O devices (e.g., "I/O connectors"), the signals transmitted on the I/O channel (e.g., "I/O signals), variables or commands represented by the signals (e.g., "I/O parameters"), or the values of the variables or commands carried by the signals (e.g., "I/O parameter values"). To the extent the term "I/O" is referenced herein without a qualifier, the context of the sentence should make clear which of these concepts is being discussed.

Further, it should be understood that an "I/O channel" represents a particular type of "communication channel" or "channel." That is, unless the context of the sentence suggests otherwise, references in this description to the term "channel" or the term "communication channel," without the qualifier "I/O," may refer to a communication link that could be an I/O channel in some implementations, but may also refer to a communication link other than an I/O channel in some implementations. Further, an "EIOC channel" is a particular type of I/O channel; it is an I/O channel between a controller and field device that relies on ethernet networking technologies. For example, an EIOC channel may be or include a physical link, such as a CatX cable (e.g., Cat5, Cat5e, Cat6), that is configured to facilitate devices communicating by way of the physical link utilizing Ethernet standards, and the controller and field device may communicate utilizing TCP/IP standards.

Likewise, an "EIOC" is a particular type of I/O device (e.g., one configured to communicate according to a process control standard as well as one or more Ethernet standards); an "EIOC connector" refers to a particular type of I/O connector (e.g., a male CatX connector or a female CatX port configured for Ethernet communication); an "EIOC signal" is a particular type of I/O signal (e.g., an I/O signal in which process variables are communicated by way of messages conforming to Ethernet standards at the physical, data link, network, or transportation layers of the OSI model). And finally, "EIOC parameters" refer to particular types of I/O parameters (e.g., I/O parameters that are transmitted to or from an EIOC field device via EIOC signals on EIOC channels).

A. The EIOC Network 7 and EIOC Scanner 75

Generally speaking, the EIOC network 7 is an I/O network for ethernet field devices and I/O cards in a process control environment, and the EIOC scanner 75 is a device configured to analyze a decoder file 199 for a field device (e.g., the field device 131) to identify one or more field device variables (sometimes "field device parameters") the field device 131 is configured to transmit or receive. The paragraphs below identify the various systems and links depicted in FIG. 1A before describing the functionality provided by the EIOC network 7 and the EIOC scanner 75.

The EIOC network 7 is configured to facilitate Ethernet communications between controllers, field devices, and intermediary networking equipment included in the EIOC network 7. The EIOC network 7 may be coupled to a process control backbone or network 10, and may include any one or more of: (i) a process controller 111 coupled to a configuration system 72 via the network 10; (ii) an EIOC 126 coupled to the controller 111 via a link 141, which may be any suitable communication link (e.g., a backplane on a mount for the controller 111 and the EIOC 126, including a bus for digital communications); (iii) a switch 128 coupled to the EIOC 126 via a link 145; (iv) the field device 131 coupled to the EIOC 126 via the link 142; and (v) field devices 133 and 135 coupled to the switch 128 via links 143 and 144, respectively. The links 142-145 may be any suitable Ethernet links.

The controller 111, which may be, by way of example, the DeltaV™ or Ovation™ controller sold by Emerson Process Management, may be any suitable process controller for a process control environment, and may have any one or more of the features or capabilities described further below with respect to controller 11. The controller 111 may include a first communication interface (e.g., an EIOC communication interface; not shown) for connecting to the EIOC link 141 and the EIOC 126 and a second communication interface (not shown) for connecting to the network 10 and any desired node of the network 10 (e.g., the configuration system 10).

Generally speaking, a "communication interface" (sometimes called a "network interface") is a device or component that enables the system of which it is a part (e.g., the controller 111) to send or receive information or data to or from other systems or components (e.g., the field device EIOC 126 and the configuration system 72). The described communication interfaces for the controller 111 may include (i) circuitry that enables connection to a wired link that carries electrical or optical signals to another device (e.g., via a coax cable or fiber optic cable) and to communicate with that other device, or (ii) circuitry that enables wireless communication (e.g., short-range or long-range communication) via electromagnetic signals, such as radio frequency (RF) signals. The described communication interfaces and systems may conform to any one or more suitable communications protocols, standards, or technologies, such as those described herein.

The EIOC 126 of the network 7 is an I/O card configured to communicate with field devices according to one or more Ethernet or Internet Protocol standards. The EIOC 126 may include a first communication interface (not shown) for establishing EIOC communication (e.g., via the link 142), as well as a second communication interface for communicating with a controller (e.g., the controller 111 via the link 141). Generally speaking, the first communication interface is an Ethernet-based interface and the second communication interface is a digital communication bus on a backplane shared by the EIOC 126 and the controller 111. The EIOC 126 may possess some of the same structure and be capable of any of the operations discussed below with respect to the field devices 15-22 and 40-46 shown in FIG. 1B The switch 128 of the network 7 may be any suitable network switch or router configured to forward or route EIOC messages between devices connected to the switch 128. As shown in FIG. 1A, the switch 128 may forward messages between the field devices 133/135 and the EIOC 125 via the links 143/144 and 145, respectively. In some embodiments, a router may be used in place of the or in addition to the switch 128.

Each of the field devices 131-135 of the network 7 is an EIOC-compatible field device. That is, each is configured to communicate with an EIOC (such as the EIOC 126) using EIOC formatted messages. Each field device 131-135 may possess any of the structure of functionality discussed below with respect to the field devices 15-22 and 40-46 shown in FIG. 1B, if desired.

The EIOC scanner 75, which may be any suitable computing device, may be coupled to the EIOC network 7 via a link 123. Additionally, the EIOC scanner 75 may be coupled via links 121 and 122 to a decoder source 120 and a configuration system 72, each of which may be any suitable electronic or computer system. The configuration system 72 may be coupled to the EIOC network 7 via the process control network or backbone 10. Each of the links 121-123 may be any suitable wired or wireless communication link. The configuration system 72 is described in more detail with respect to FIG. 1B.

The EIOC scanner 75 includes a memory 101 storing a scanner tool 113 and the decoder file 199; processor 102; communication interface 103 coupled to the processor 102; and a user interface 104 coupled to the processor 102. The user interface 104 may include an input component 106 (e.g., touch sensors, a keyboard, a mouse, mechanical buttons, etc.) and a display 107 (e.g., LCD, LED, CRT, plasma, projection displays, heads-up displays, etc.). The user interface 104 may include output components in addition to or instead of the display 107, such as a speaker for audio output, a motor for haptic output, light sources (e.g., LED) for visual output, etc.

The processor 102 may execute the tool 113, which is a set of computer-readable instructions that, when executed by the processor 102, cause the processor 102 to implement the functions attributed herein to the scanner 75.

In operation, the EIOC scanner 75 receives the decoder file 199 via the link 121 from the decoder source 120. The decoder source 120 may be a server (e.g., associated with the manufacturer of the field device 131). The decoder file 199 may be retrieved from a plurality of decoder files based on a model number, MAC address, or some other identifier unique to the field device 131 or to the model of the field device 131. In some embodiments, the scanner 75 retrieves the decoder file 199 from the field device 131 via a wired or wireless connection.

Generally speaking, the decoder file 199 includes a list of field device variables to which the field device 131 is configured to write or read. The decoder file 199 further includes a code for interpreting EIOC messages sent or received by the field device 131. This code may specify a message position (e.g., a byte at a particular offset from a header of the message) at which each field device variable should be written or read. As explained below, the scanner 75 may analyze the decoder file 199 to import the field device variables into the process control system as process variables and to enable the EIOC 75 to write and read values to EIOC messages exchanged with the field device 131.

When executing the scanner tool 113, the EIOC scanner 75 analyzes the decoder file 199 to identify one or more field device variables that the field device 131 is configured to transmit or receive. The scanner 75 may also analyze the decoder file 199 to identify message positions, mapped to the identified field device variables, for messages the field device 131 is configured to transmit or receive (e.g., to the EIOC 126). Upon identifying the field device variables and the corresponding mapped message positions, the scanner 75 may create a record linking the message positions with a set of system tags (e.g., new system tags not currently used by the process control system 5) intended to represent the identified field device variables.

Then, the EIOC scanner 175 may update the configuration system 72 to include the record, thereby formally assigning (from the perspective of the process control system 5) the set of system tags to the appropriate message positions (for messages sent between the field device 131 and the EIOC 126) so that the set of system tags represent the one or more field device. Specifically, the configuration system may include a database storing a map 132 linking system tags to I/O channels. For traditional I/O cards and field devices, an I/O channel may be a particular physical 4-20 mA channel on the I/O card (e.g., each card may have 32 I/O channels). For EIOCs and EIOC field devices, the I/O channel may be identifiable by particular message position for EIOC messages the EIOC is configured to transmit or receive.

Then, the updated configuration database 72 may be used to configure the process control system 5, thereby putting the assigned system tags into operation such that relevant field device variables associated with the field device 131 are referenceable, by systems within the process control system 5, via the assigned systems tags. The process control system 5 is updated to utilize the system tags such that (i) when the controller 111 generates a controller output referencing a system tag for a particular variable, the EIOC 126 encodes a field device input message for the field device 131 such that the EIOC 126 writes the controller output to a message position, within the field device input message, linked or assigned to the system tag for the particular variable, and (ii) when the field device 131 transmits to the EIOC 126 a field device output message, including a field device output value at a given message position, the EIOC 126 automatically decodes the field device output message and updates a system tag, linked to the given message position, by writing the field device output value to the system tag (e.g., by writing the value to a controller input message transmitted to the controller 11.

The scanner 75 offers faster and more automated configuration techniques for integrating new or updated field devices or field device variables into a process control system when compared to manual techniques for integrating a new field device into a process control system. In a typical scenario involving manual techniques, integrating field device variables associated with a new field device into a process control system may involve a user (i.e., a human) manually reading a manual or other documentation (e.g., issued by the manufacturer) to identify the field device variables the new field device is capable of sending or receiving. The user might then manually update a configuration database by adding a system tag to the configuration database and manually assigning the new system tag to an I/O channel or message position that the user believes is associated with the field device variable she wants the new system tag to represent (e.g., a belief derived from the manufacturers manual or guide).

Notably, this manual technique is time consuming and prone to current and future errors. The laborious and time intensive process of manually reading documentation and programming a configuration database accordingly is self-evident. Regarding potential errors, the user may misunderstand the documentation and assign a new system tag to a wrong I/O channel or a wrong message position, resulting in the system tag being assigned to the wrong field device variable (and thus resulting in the system tag carrying incorrect values). Similarly, if the manufacturer updates the firmware or software of a field device such that the field device now writes or reads the field device variable differently (e.g., at a different message position), the corresponding system tags may "break" (e.g., by way of the process control system reading from or writing to message positions no longer associated with the desired field device variable). Further still, a field device manufacturer or make available new field device variables after the field device has been installed and after the process control system has been configured accordingly. In such a scenario, the process control system may have no way of integrating the new field device variable without a human somehow becoming aware of the update, manually reviewing the documentation to determine how the new variable should be read or written to, and then manually configuring the process control system accordingly. It should go without saying that such updates may be easily missed or ignored.

The EIOC scanner 75 addresses these problems with error-prone, time-intensive, and labor-intensive manual configuration techniques by utilizing a decoder file associated with a field device (e.g., the decoder file 199) to automatically map field device variables for an EIOC field device to message positions so that the field device variables can be easily and quickly integrated into the process control system.

B. The Process Control System 5

FIG. 1B is a block diagram of an example process plant, process control system, or process control environment 5, including the EIOC network 7 shown in FIG. 1B.

The process plant 5 controls a process, which may be said to have one or more "process outputs" characterizing the state of the process (e.g., tank levels, flow rates, material temperatures, etc.) and one or more "process inputs" (e.g., the state of various environmental conditions and actuators, the manipulation of which may cause process outputs to change). As a general matter, at least some of the process outputs are measured and utilized as "control inputs" to one or more controllers controlling the process. The one or more controllers may, in turn, transmit one or more "control outputs," "control signals," or "commands" (which may be thought of as process inputs, or signals that influence process inputs). Generally, the process plant or control system 5 of FIG. 1B includes a field environment 122 (e.g., "the process plant floor 122") and a back-end environment 125, each of which is communicatively connected by a process control backbone or data highway 10, which may include one or more wired or wireless communication links, and may be implemented using any desired or suitable communication protocol such as, an Ethernet protocol.

At a high level (and as shown in FIG. 1B), the field environment 122 includes physical components (e.g., process control devices, networks, network elements, etc.) that are disposed, installed, and interconnected to operate to control the process during run-time. For example, the field environment includes an I/O network 6 and the I/O network 7 (i.e., the EIOC network 7). By and large, the components of each of these I/O networks are located, disposed, or otherwise included in the field environment 122 of the process plant 5. Generally speaking, in the field environment 122 of the process plant 5, raw materials are received and processed using the physical components disposed therein to generate one or more products.

By contrast, the back-end environment 125 of the process plant 5 includes various components such as computing devices, operator workstations, databases or databanks, etc. that are shielded or protected from the harsh conditions and materials of the field environment 122. In some configurations, various computing devices, databases, and other components and equipment included in the back-end environment 125 of the process plant 5 may be physically located at different physical locations, some of which may be local to the process plant 5, and some of which may be remote.

1. The Field Environment 122 Associated with the System 5

As noted, the field environment 122 includes the I/O networks 6 and 7, each of which may be coupled to the plant network 10. Each I/O network 6 and 7 includes one or more controllers, field devices communicatively connected to the one or more controllers, and intermediary nodes facilitating communication between the controllers and the field devices (e.g., I/O cards).

Each process controller in the process plant 5 implements a control strategy defined by one or more control routines, which may be stored to a memory of the controller. When a processor of the controller executes one or more of the control routines, the controller transmits to a field device a control signal (i.e., a "control output") over wired or wireless process control communication links or networks to other field devices to control the operation of a process in the plant 5. The controller may generate a control signal based on: (i) one or more received signals, which may be referred to as "control inputs" (e.g., one or more received signals representing measurements obtained by field devices), and (ii) the logic of the one or more control routines, which may be defined by one or more software elements (e.g., function blocks). Typically, a controller manipulates a process input (which may be referred to as a "manipulated variable") to change a particular process output (which may be referred to as a "controlled variable" or simply a "process variable")

based on feedback (i.e., a measurement of the controlled variable) and a desired value for the process output (i.e., a setpoint).

Generally, at least one field device performs a physical function (e.g., opening or closing a valve, increasing or decreasing a temperature, taking a measurement, sensing a condition, etc.) to control the operation of a process implemented in the process plant 5. Some types of field devices communicate with controllers by using I/O devices (e.g., "I/O cards"). Process controllers, field devices, and I/O cards may be wired or wireless, and any number and combination of wired and wireless process controllers, field devices, and I/O devices may be included in the process plant environment or system 5.

For example, FIG. 1B illustrates a process controller 11 that implements a control strategy defined by one or more control routines, which may be stored to a memory of the controller. The controller 11 is communicatively connected to wired field devices 15-22 via input/output (I/O) cards 26 and 28, and that is communicatively connected to wireless field devices 40-46 via a wireless gateway 35 and the data highway 10.

In some configurations (not shown), the controller 11 may be communicatively connected to the wireless gateway 35 using one or more communications networks other than the backbone 10, such as by using any number of other wired or wireless communication links that support one or more communication protocols, e.g., Wi-Fi or other IEEE 802.11 compliant wireless local area network protocol, mobile communication protocol (e.g., WiMAX, LTE, or other ITU-R compatible protocol), Bluetooth®, HART®, WirelessHART®, Profibus, FOUNDATION® Fieldbus, etc.

The controller 11, which may be, by way of example, the DeltaV™ or Ovation™ controller sold by Emerson Process Management, may operate to implement a batch process or a continuous process using at least some of the field devices 15-22 and 40-46. In an embodiment, in addition to being communicatively connected to the process control data highway 10, the controller 11 is also communicatively connected to at least some of the field devices 15-22 and 40-46 using any desired hardware and software associated with, for example, standard 4-20 mA devices, I/O cards 26, 28, or any smart communication protocol such as the FOUNDATION® Fieldbus protocol, the HART® protocol, the WirelessHART® protocol, etc. In FIG. 1A, the controller 11, the field devices 15-22 and the I/O cards 26, 28 are wired devices, and the field devices 40-46 are wireless field devices. Of course, the wired field devices 15-22 and wireless field devices 40-46 could conform to any other desired standard(s) or protocols, such as any wired or wireless protocols, including any standards or protocols developed in the future.

The process controller 11 of FIG. 1B includes a processor 30 that implements or oversees one or more process control routines 38 (e.g., that are stored in a memory 32). A control routine is a set of instructions, executable by a processor, for performing one or more operations to provide or perform control of at least part of a process. Generally speaking, a control routine may be understood as software configured to implement a particular control strategy. A control routine may include one or more function blocks associated with various functions.

The processor 30 is configured to communicate with the field devices 15-22 and 40-46 and with other nodes communicatively connected to the controller 11. It should be noted that any control routines or modules described herein may have parts thereof implemented or executed by different controllers or other devices if so desired. Likewise, the control routines or modules 38 described herein which are to be implemented within the process control system 5 may take any form, including software, firmware, hardware, etc. Control routines may be implemented in any desired software format, such as using object-oriented programming, ladder logic, sequential function charts, function block diagrams, or using any other software programming language or design paradigm. The control routines 38 may be stored in any desired type of memory 32, such as random-access memory (RAM), or read only memory (ROM). Likewise, the control routines 38 may be hard-coded into, for example, one or more EPROMs, EEPROMs, application specific integrated circuits (ASICs), or any other hardware or firmware elements. Thus, the controller 11 may be configured to implement a control strategy or control routine in any desired manner.

The controller 11 implements a control strategy using what are commonly referred to as function blocks, where each function block is an object or other part (e.g., a subroutine) of an overall control routine and operates in conjunction with other function blocks (via communications called links) to implement process control loops within the process control system 5. Control based function blocks typically perform one of: (i) an input function, such as that associated with a transmitter, a sensor or other process parameter measurement device (sometimes referred to as "input blocks"); (ii) a control function, such as that associated with a control routine that performs PID, fuzzy logic, etc. (sometimes referred to as "control blocks"); or (iii) an output function which controls the operation of some device, such as a valve, to perform some physical function within the process control system 5 (sometimes referred to as "output blocks"). Of course, hybrid and other types of function blocks exist.

Function blocks may be stored in and executed by the controller 11, which is typically the case when these function blocks are used for, or are associated with standard 4-20 mA devices and some types of smart field devices such as HART® devices, or may be stored in and implemented by the field devices themselves, which can be the case with FOUNDATION® Fieldbus devices. One or more of the control routines 38 may implement one or more control loops which are performed by executing one or more of the function blocks.

The wired field devices 15-22 may be any types of devices, such as sensors, valves, transmitters, positioners, etc., while the I/O cards 26 and 28 may be any types of process control I/O devices conforming to any desired communication or controller protocol. In FIG. 1A, the field devices 15-18 are standard 4-20 mA devices or HART® devices that communicate over analog lines or combined analog and digital lines to the I/O card 26, while the field devices 19-22 are smart devices, such as FOUNDATION® Fieldbus field devices, that communicate over a digital bus to the I/O card 28 using a FOUNDATION® Fieldbus communications protocol. In some embodiments, though, at least some of the wired field devices 15, 16 and 18-21 or at least some of the I/O cards 26, 28 additionally or alternatively communicate with the controller 11 using the process control data highway 10 or by using other suitable control system protocols (e.g., Profibus, DeviceNet, Foundation Fieldbus, ControlNet, Modbus, HART, etc.).

In FIG. 1B, the wireless field devices 40-46 communicate via a wireless process control communication network 70 using a wireless protocol, such as the WirelessHART® protocol. Such wireless field devices 40-46 may directly communicate with one or more other devices or nodes of the wireless network 70 that are also configured to communicate wirelessly (using the wireless protocol or another wireless protocol, for example). To communicate with one or more other nodes that are not configured to communicate wirelessly, the wireless field devices 40-46 may utilize a wireless gateway 35 connected to the process control data highway 10 or to another process control communications network. The wireless gateway 35 provides access to various wireless devices 40-58 of the wireless communications network 70. In particular, the wireless gateway 35 provides communicative coupling between the wireless devices 40-58, the wired devices 11-28, or other nodes or devices of the process control plant 5. For example, the wireless gateway 35 may provide communicative coupling by using the process control data highway 10 or by using one or more other communications networks of the process plant 5.

Similar to the wired field devices 15-22, the wireless field devices 40-46 of the wireless network 70 perform physical control functions within the process plant 5, e.g., opening or closing valves, or taking measurements of process parameters. The wireless field devices 40-46, however, are configured to communicate using the wireless protocol of the network 70. As such, the wireless field devices 40-46, the wireless gateway 35, and other wireless nodes 52-58 of the wireless network 70 are producers and consumers of wireless communication packets.

In some configurations of the process plant 5, the wireless network 70 includes non-wireless devices. For example, in FIG. 1A, a field device 48 of FIG. 1A is a legacy 4-20 mA device and a field device 50 is a wired HART® device. To communicate within the network 70, the field devices 48 and 50 are connected to the wireless communications network 70 via a wireless adaptor 52a, 52b. The wireless adaptors 52a, 52b support a wireless protocol, such as WirelessHART, and may also support one or more other communication protocols such as Foundation® Fieldbus, PROFIBUS, DeviceNet, etc. Additionally, in some configurations, the wireless network 70 includes one or more network access points 55a, 55b, which may be separate physical devices in wired communication with the wireless gateway 35 or may be provided with the wireless gateway 35 as an integral device. The wireless network 70 may also include one or more routers 58 to forward packets from one wireless device to another wireless device within the wireless communications network 70. In FIG. 1A, the wireless devices 40-46 and 52-58 communicate with each other and with the wireless gateway 35 over wireless links 60 of the wireless communications network 70, or via the process control data highway 10.

2. The Back-End Environment 125 of the Plant 5

As noted, the back-end environment 125 includes various components such as computing devices, operator workstations, databases or databanks, etc. that are typically shielded or protected from the harsh conditions and materials of the field environment 122. The back-end environment 125 may include any one or more of the following, each of which may be communicatively connected to the data highway 10: (i) one or more operator workstations 71; (ii) a configuration application 72a and a configuration database 72b; (iii) a data historian application 73a and a data historian database 73b; (iv) one or more other wireless access points 74 that communicate with other devices using other wireless protocols; and (v) one or more gateways 76, 78 to systems external to the immediate process control system 5.

The operator workstations 71 may be utilized by operators to view and monitor run-time operations of the process plant 5 (e.g., those implemented by devices in the EIOC network 7), as well as take any diagnostic, corrective, maintenance, or other actions that may be required. At least some of the operator workstations 71 may be located at various, protected areas in or near the plant 5, and in some situations, at least some of the operator workstations 71 may be remotely located, but nonetheless in communicative connection with the plant 5. Operator workstations 71 may be wired or wireless computing devices. A user may utilize the operator workstation 71 to view the system tags created by the scanner 75 based on the analysis of the decoder file 199, as well as to view any associated control routines.

The data historian application 73a operates to collect some or all of the data provided across the data highway 10 (e.g., parameters transmitted or received by any of the field devices or controllers in the EIOC network 7), and to historize or store the data in the historian database 73b for long term storage. Similar to the configuration application 72a and configuration database 72b, the data historian application 73a and historian database 73b are centralized and have a unitary logical appearance to the process control system 5, although multiple instances of a data historian application 73a may execute simultaneously within the process control system 5, and the data historian 73b may be implemented across multiple physical data storage devices. The data historian 73 may collect and historize any one or more of the process variables created by way of the scanner 75.

The one or more other wireless access points 74 enable devices in the back-end environment 125 (and sometimes devices in the field environment 122, such as those in the EIOC network 7) to communicate with other devices using wireless protocols, such as Wi-Fi or other IEEE 802.11 compliant wireless local area network protocols, mobile communication protocols such as WiMAX (Worldwide Interoperability for Microwave Access), LTE (Long Term Evolution) or other ITU-R (International Telecommunication Union Radio communication Sector) compatible protocols, short-wavelength radio communications such as near field communications (NFC) and Bluetooth, or other wireless communication protocols. Typically, such wireless access points 74 allow handheld or other portable computing devices (e.g., user interface devices 75) to communicate over a respective wireless process control communication network that is different from the wireless network 70 and that supports a different wireless protocol than the wireless network 70. For example, a wireless or portable user interface device 75 may be a mobile workstation or diagnostic test equipment that is utilized by an operator within the process plant 5 (e.g., an instance of one of the operator workstations 71). In some scenarios, in addition to portable computing devices, one or more process control devices (e.g., controller 11, field devices 15-22, or wireless devices 35, 40-58) also communicate using the wireless protocol supported by the access points 74.

The gateways 76 and 78 may interface with systems that are external to the immediate process control system 5 (e.g., enabling communication between external systems and one or more devices in the EIOC network 7). Typically, such systems are customers or suppliers of information generated or operated on by the process control system 5. For example, the process control plant 5 may include a gateway node 76 to communicatively connect the immediate process plant 5 with another process plant. Additionally or alternatively, the process control plant 5 may include a gateway node 78 to communicatively connect the immediate process plant 5 with an external public or private system, such as a laboratory system (e.g., Laboratory Information Management System or LIMS), an operator rounds database, a materials handling system, a maintenance management system, a product inventory control system, a production scheduling system, a weather data system, a shipping and handling system, a packaging system, the Internet, another provider's process control system, or other external systems.

Although FIG. 1B only illustrates a single controller 11 with a finite number of field devices 15-22 and 40-46, wireless gateways 35, wireless adaptors 52, access points 55, routers 58, and wireless process control communications networks 70 included in the example process plant 5, this is only an illustrative and non-limiting embodiment. Any number of controllers 11 may be included in the process control plant or system 5, and any of the controllers 11 may communicate with any number of wired or wireless devices and networks 15-22, 40-46, 35, 52, 55, 58 and 70 to control a process in the plant 5.

Remaining with FIG. 1B, the configuration application 72a and the configuration database 72b may be utilized to configure certain aspects of the plant 5. Various instances of the configuration application 72a may execute on one or more computing devices (not shown) to enable users to create or change process control modules and download these modules via the data highway 10 to the controller 11 or any process controller in the EIOC network 7, as well as to enable users to create or change operator interfaces via which in operator is able to view data and change data settings within process control routines (e.g., those implemented via controllers in the EIOC network 7). The configuration database 72b stores the created (e.g., configured) modules or operator interfaces. Generally, the configuration application 72a and configuration database 72b are centralized and have a unitary logical appearance to the process control system 5, although multiple instances of the configuration application 72a may execute simultaneously within the process control system 5, and the configuration database 72b may be implemented across multiple physical data storage devices. Accordingly, the configuration application 72a, the configuration database 72b, and the user interfaces thereto (not shown) comprise a configuration or development system 72 for control or display modules. Typically, but not necessarily, the user interfaces for the configuration system 72 are different than the operator workstations 71, as the user interfaces for the configuration system 72 are utilized by configuration and development engineers irrespective of whether or not the plant 5 is operating in real-time, whereas the operator workstations 71 are utilized by operators during real-time operations of the process plant 5 (also referred to interchangeably here as "run-time" operations of the process plant 5).

During commissioning, the configuration database 72b may be configured to store data and other information that specifically identifies or addresses the various devices or components and their interconnections that plant personnel desire to be implemented on the process plant floor or field environment 122. Some of this commissioning data may be provided to components in the field environment 122 for use in commissioning of devices and loops therein, and some of this data may be utilized in the back-end environment 125, e.g., for the design, development, and preparation of control modules and or operator interface modules that will operate in conjunction with the field environment 122 during live operations of the process plant 5. In an example, an approved control module is downloaded into a process controller (e.g., in the EIOC network 7) so that, when executed during live operations, the process controller operates in accordance with its resident control module to send and receive various signals to/from other components in its loop (and, in some cases, to/from other process controllers), thereby controlling at least a portion of the process in the process plant 5.

The configuration database 72b may store a number of logical identifiers (or tags) of components in the field environment 122, enabling the controller 11 and other devices to reference the components and signals associated with the components by way of the logical identifiers.

For example, for a given field device, the configuration database 72b may store information mapping or binding a logical identifier to a particular hardware address or I/O channel. The hardware address may identify a particular controller, a particular I/O card connected to the particular controller, and/or a particular address for the I/O channel connecting the particular I/O card to the field device. For EIOCs and associated field devices, the database 72b may store an address for each logical identifier (e.g., tag or DST) identifying a particular controller, a particular EIOC connected to the particular controller, and/or a particular message position for EIOC messages sent or received by the particular EIOC that is expected to carry the value for the logical identifier.

In some instances, this mapping or binding may be stored at the controller 11, the user interface device 75, the operator workstation 71, or any other desired device (e.g., any device needing to resolve the logical identifier). After a logical identifier has been bound to a hardware address or I/O channel, the identifier is considered "assigned." In some cases, the system 5 includes "unassigned" logical identifiers, which are identifiers that a software element (e.g., a control routine or a function block) references but that has no binding. That is, a logical identifier is considered "unassigned" when the system 5 and the configuration database 72b have no hardware address or I/O channel that has been bound to the tag. Thus, when an unassigned logical identifier is referenced by a control routine, no value carried by a signal in the plant 5 will be read and no command will be transmitted via a signal to a field device in the plant 5. Each of the tags in the database 72b may generically be referred to as a "system tag." Example types of tags that may be stored at the configuration database 72b and used by the plant 5 include Physical Device Tags (PDTs), Device Signal Tags (DSTs), Logical Device Tags (LDTs), and I/O nodes or node tags (sometimes called EIOC nodes or node tags).

A PDT represents a particular instrument, controller, valve, or other physical field device. A DST represents a particular signal that is received or generated by a particular device and that typically corresponds to a particular parameter utilized by the field device. For some devices, a DST comprises a combination of a device's PDT and an identifier of a specific signal received or generated by that device, e.g., an identifier of a specific parameter referenced by a control module. For some devices (e.g., legacy or dumb devices) a PDT represents both the physical device and a signal generated by the device. Generally speaking, a device's logical identifier is used by the process plant 5 in both the field environment 122 and in the back-end environment 125 to uniquely identify the device.

Generally speaking, a LDT may be thought of as representing a group of related DSTs. For example, a set of 10 diagnostic parameters for a particular physical device may each be given a single LDT indicating that each of the 10 diagnostic parameters is a diagnostic parameter.

Finally, each EIOC node or node tag represents a unique EIOC. Thus, a given EIOC connected to six field devices may be associated with a particular node tag (e.g., EIOC04) and each of the six field devices connected to the EIOC may be assigned the node tag. As a result, a single process variable may have: (i) an assigned DST (identifying a particular signal), (ii) an assigned LDT (identifying a logical group to which the DST or parameter belongs), (iii) an assigned DT or PDT (identifying a particular field device that receives or transmits the particular signal), and (iv) an assigned EIOC node (identifying a particular EIOC linked to the particular field device).

In some instances, the smart field devices 19-22 also may store "source tags" or "source identifiers" that are unique to the smart field devices 19-22 (likewise for smart field devices in the EIOC network 7). These source may be distinct from the system tags stored at the configuration database 72b and utilized by the plant 5 to identify the field devices. Source tags may or may not be stored at the configuration database 72b, depending on the implementation.

3. An Example Control Routine 200 that May be Found in the Process Control System 5

Figure 2:
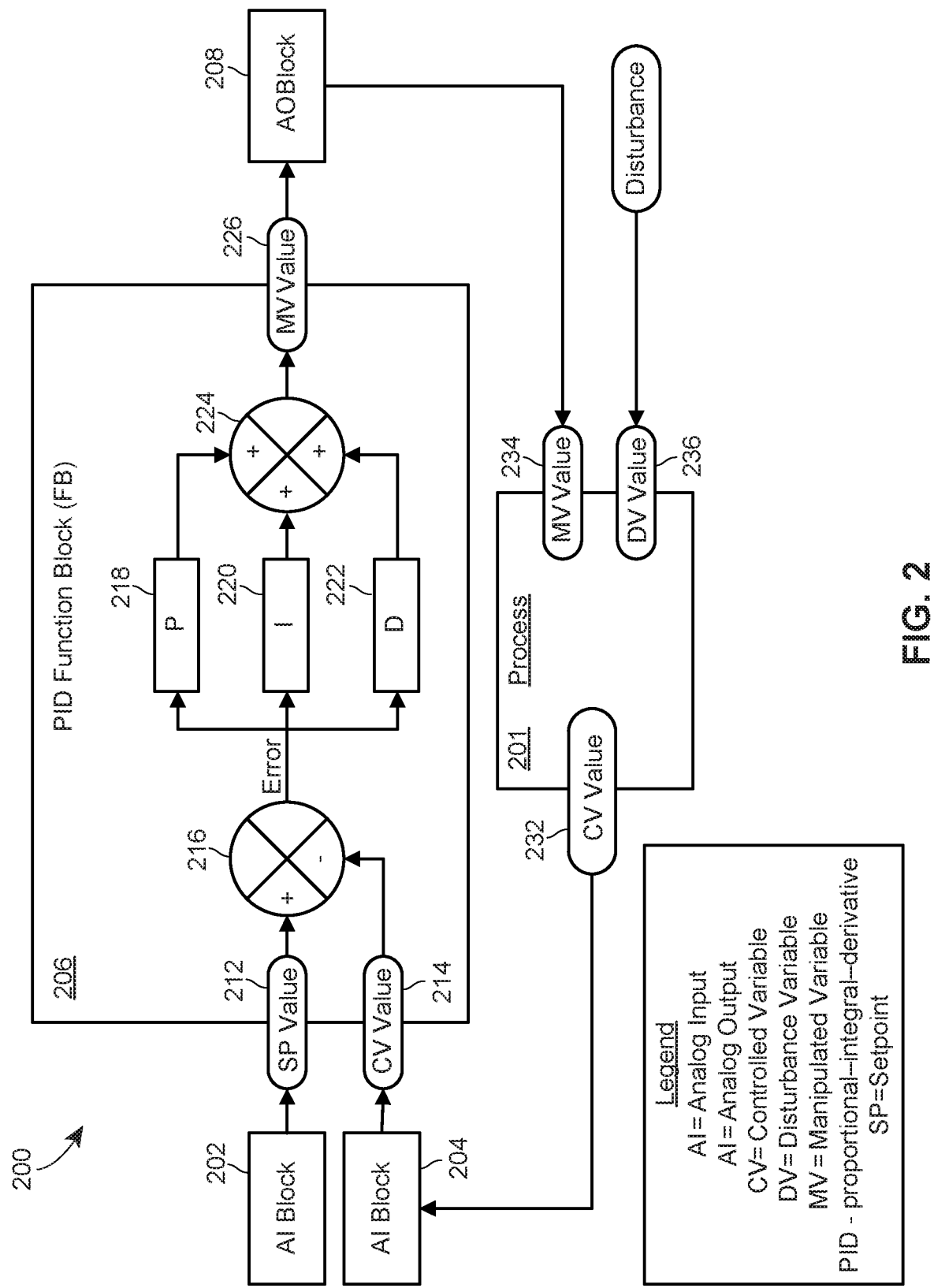
FIG. 2 depicts a control routine, representing an example of a control routine that may be implemented by the controllers shown in FIGS. 1A and 1B.

FIG. 2 depicts a control routine 200, representing an example of the control routine 38 that may be implemented by the controllers shown in FIGS. 1A and 1B.

At a high level, the control routine 200 controls a process 201 by attempting to drive a controlled variable (CV) (e.g., a water tank level) to a particular set point. The control routine 200 receives a set-point (SP) or desired value 212 for the CV (sometimes the CV is simply called a process variable or PV), measures an actual value 214 of the CV, calculates the error or difference 216 between the SP and measured CV value, and then calculates a command or controller output (e.g., a manipulated variable (MV) 226) to which the CV is responsive (e.g., an inlet valve position to the tank) (e.g., based on a sum 224 of a proportional factor 218, an integral factor 220, a derivative factor 222, or some combination thereof). The controller may transmit the value 226 (e.g., an actuator position), via the AO block 208, to the appropriate MV (e.g., an actuator) to drive a CV 232 (e.g., a temperature, level, or flow rate) to the SP value 212. As shown, the CV 232 in the process 201 may be influenced by one or more parameters outside the direct control of the loop 200. These parameters may be referred to as disturbance variables (DVs) 236.

As shown, the control routine 200 includes four blocks: an analog input (AI) block 202, an AI block 204, a control block 206, and an AO block 208. Depending on the implementation, the AI blocks 202 and 204 may represent analog signals received (e.g., from a field device) via an I/O channel by a controller implementing the routine 200 or an I/O card coupled to the controller. For example, the AI block 204 may be bound to a first device signal tag (DST) identifying a particular AI I/O channel at a first I/O card, and the value provided by the AI block 204 may consequently be driven by the value of the signal on the particular AI I/O channel (e.g., a 4-20 ma signal provided by a flow transmitter field device representing a measured flow). Similarly, the AO block 208 may represent an analog signal to be transmitted (e.g., to a field device) via an I/O channel by a controller implementing the routine 200 or to an I/O card coupled to the controller. To illustrate, the AO block 208 may be bound to a second DST identifying a particular AO I/O channel at a second IO card. Thus, the value fed to the AO block 208 may cause the second I/O card to drive a signal on the particular AO I/O channel based on the value received at the AO block 208 (e.g., the value may cause the second I/O card to drive a 4-20 ma signal via the AO I/O channel to a valve field device to control the valve's position).

As an example, the routine 200 may be configured to control the field device 131 and may be implemented by the controller 111 shown in FIG. 1A. In such an example, when the controller 111 writes a value for a DST to the AO block 208, the controller 111 may transmit the DST value to the EIOC 126 and may cause the EIOC 126 to transmit the value via the link 142 to the field device 131 via an EIOC message (e.g., wherein the value is encapsulated within a field device input message).

Likewise, the field device 131 may transmit a measurement or other parameter as part of an EIOC message (e.g., wherein the measurement is encapsulated within a field device output message) via the link 142 to the EIOC 126. The EIOC 126 may then map the measurement or parameter to a DST or another system tag. The routine 200 may receive the measurement at the AI block 204.

C. An Example Traditional I/O Network 300 that May be Found in the Process Control System 5

Figure 3:
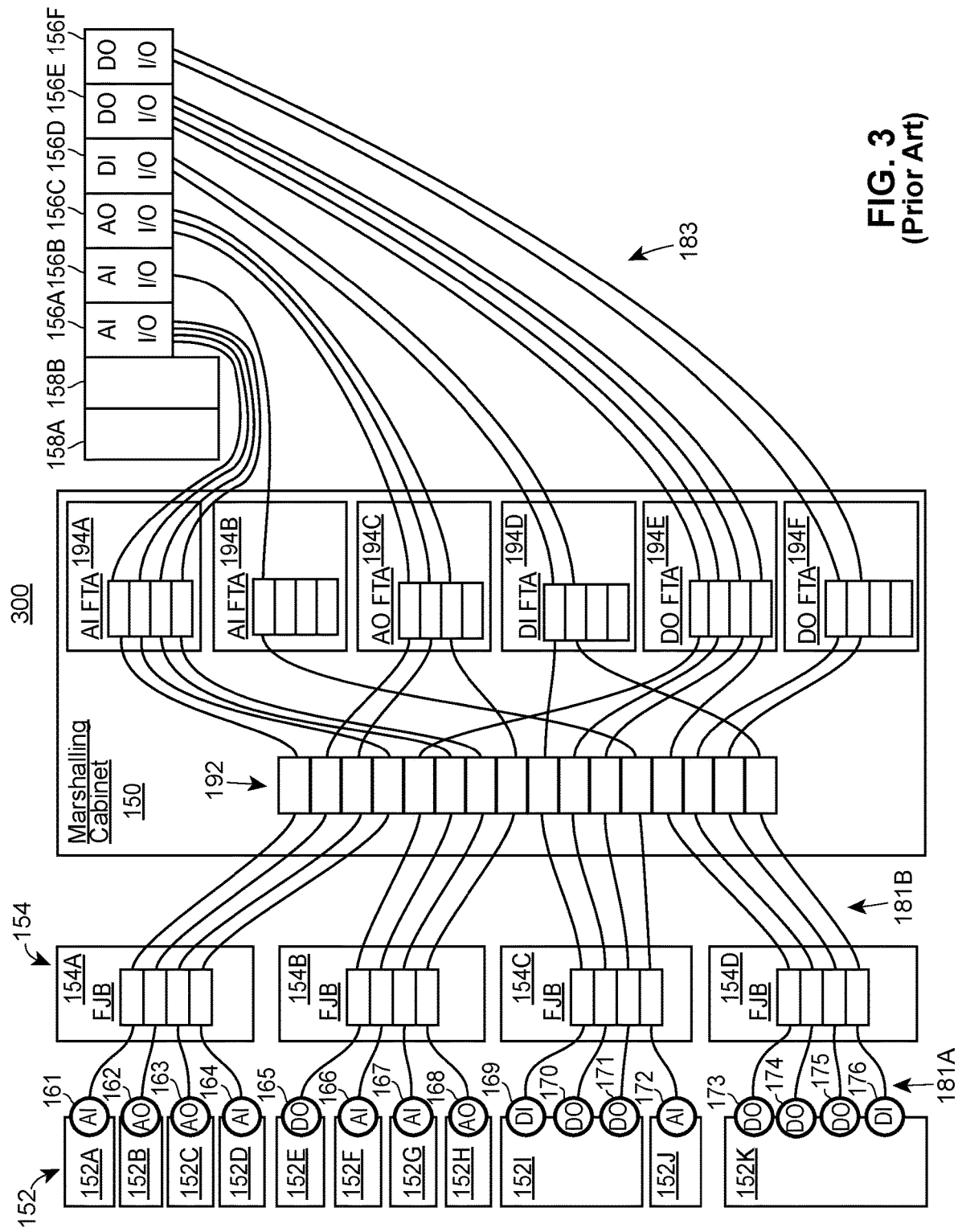
FIG. 3 depicts a prior art I/O network including traditional I/O cards that, unlike the EIOC shown in FIG. 1A, require fixed, dedicated, and manually configured wiring and marshalling based on the signal type for which each traditional I/O card is configured.

FIG. 3 depicts a prior art I/O network 300 including traditional I/O cards 156 that, unlike the EIOC 126, require fixed, dedicated, and manually configured wiring and marshalling based on the signal type for which each I/O card 156 is configured.

The EIOC network 7 offers a number of benefits over traditional I/O networks such as the network 300. For example, the EIOC network 7 does not require cross-marshalling and thus avoids the time-intensive and labor-intensive configuration process associated with the traditional network 300. Rather, the EIOC network 7 enables a single EIOC to be connected to multiple field devices of any suitable signal configuration (e.g., AI, AO, DI, DO, RTD, TC, smart field devices, "dumb" field devices, etc.). Further, the EIOC network 7 avoids inefficient deployment of I/O cards often associated with traditional I/O networks such as the I/O network 300. While traditional I/O networks often have multiple I/O cards with unused I/O channels due to the fact that traditional I/O cards must each be configured for a specific signal type, each EIOC in the EIOC network 7 can be linked to any suitable field device and can send/receive any suitable parameter type.

Regarding the I/O network 300, at a high level, manual or direct marshalling is a labor intensive process involves wiring each field device I/O terminal or connector to a particular terminal block in a marshalling cabinet; wiring each I/O card channel to a terminal block in a field terminal array or FTA (disposed in the marshalling cabinet) that is dedicated to that I/O card; and coupling the field device I/O connectors to the I/O cards by cross-marshalling the terminal blocks and the FTAs in the marshalling cabinet.

Typically, each traditional I/O card 156 is permanently configured for one, and only one, signal type selected from a plurality of signals types (e.g., AO, AI, DI, DO, Resistance Thermal Detector (RTD), or Thermocouple (TC)). For example, the I/O card 156 is permanently configured for AI signal types and cannot be configured or reconfigured to communicate according to AO, DI, DO, RTD, or TC signal types.

The I/O network 300 includes a process controller 158A, a redundant backup controller 158B (collectively "the controller 158") and the traditional I/O cards 156A-F, which are communicatively connected to a set of field devices 152A-K via a marshalling cabinet 150, a set of field junction boxes (FJBs) 154A-D, and a number of wired links 181A, 181B, and 183.

The I/O network 300 enables the process controller 158 to control a process, or a part of a process, via one or more of the field devices 152. Unfortunately, the design of the I/O network 300 is inflexible and difficult to change after field wiring has been completed, making project changes expensive in terms of labor, time, and material.

During the design phase of the I/O network 300, process and instrumentation diagrams (P&IDs) are designed, providing an early view of the control elements (e.g., field devices 152) and how they are intended to be used in the control strategies involving the network 300. Then, an instrument list is derived from these P&IDs, which is a detailed list of each element (e.g., field device) in the design, including the device type, manufacturer, calibration ranges, etc., as well as the physical location of each element with in the process equipment. As part of the design phase, designers define the field signals associated with each field device 152 and assign each assigned signal to a controller.

As shown in FIG. 3, each of the field devices 152 has one or more I/O terminals 161-176 for sending or receiving signals, and each of the terminals 161-176 has a specified signal type (e.g., AO, AI, DI, or DO). For the sake of clarity, the terminals are labeled as "input" or "output" from the perspective of the control system. For example, the field devices including the terminals 161, 164, 166, 167, and 172 are each configured to transmit an analog input or "AI" signal (e.g., carrying a process measurement) via the terminals. The field devices including the terminals 162, 163, and 168 are each configured to receive an analog input or "AO" signal (e.g., carrying a control command, such as a command to open a valve) via the terminals. The field devices including the terminals 169 and 176 are each configured to transmit a digital input or "DI" signal via those terminals. The field devices including the terminals 165, 170, 171, 173, 174, and 175 are each configured to transmit discrete output or "DO" signals via those terminals.

As shown in FIG. 3, each of the signals associated with the terminals 161-176 is assigned to the controller 158. A signal count of each type of signal specified for the terminals 161-176 enables designers to determine the number and type of each I/O card 156 necessary to enable the controller 158 to communicate with each of the field device 152 inputs and outputs.

Selecting I/O cards is important because each I/O card 156 (i) has a limited number of I/O channels, and (ii) is configured for a particular type of signal and can only be utilized for that type of signal. Note, the term "I/O channel" generally refers to the logical link connecting an I/O card or controller to a field device. The traditional I/O cards 156 are limited to four I/O channels, but it will be noted that some dedicated traditional I/O cards have a different limit on I/O channels (e.g., eight channels). As noted, each I/O card 156 is configured for a particular type of signal and can be utilized only for that type of signal. As an example, the AI I/O card 156A can only send AI signals; it cannot send DI signals or receive DO or AO signals. This requirement, along with the requirement that each of the I/O cards 156 only supports up to four channels, results in unused and wasted terminal blocks. For example, five of the field device terminals 161-176 are configured to transmit an AI signal, which necessitates two I/O cards 156 despite the fact that one of the I/O cards 156 will have three unused channels or blocks.

To build the network 300, it must first be designed. Then, technicians begin the field wiring phase of development. The I/O terminals 161-176 are wired to the corresponding field junction boxes FJBs 154A-154D, which are then wired to a set of terminals 192 in a marshalling cabinet 150. Note, each of the terminals 161-176 is connected to a corresponding terminal in a FJB and a corresponding terminal 192 in the marshalling cabinet 150. That is, for every I/O terminal 161-176 that exists, a corresponding terminal 192 must be utilized. The set of terminals 192 are wired to field terminal assemblies (FTAs) 194A-194F, each of which is wired to a corresponding I/O card 156A-F.

The process of wiring the terminals 192 to the FTAs 194 is referred to as "cross-marshalling." Cross-marshalling typically is necessary because the organization of wires connecting to the terminals 192 is determined by the physical layout of the plant, while the organization of the FTAs 194 is determined by signal type for the traditional I/O card 156 connected to the FTA. Specifically, field devices sharing close proximity often share a FJB and are wired to the first available terminals 192, resulting in groupings of terminals 192 that roughly correspond to FJBs but that have no other discernible method of organization. By contrast, the FTAs 194 are organized by signal type because each feeds a particular I/O card 156. For example, the FTA 194A corresponds to the AI card 156A. Thus, each of the terminals 194A needs to be connected to a terminal 192 that is connected to an AI channel (i.e., wired to an AI field device terminal) Similarly, the FTA 194C corresponds to the AO card 156C, so each of the terminals in the FTA 194C should be wired to terminals 192 that are wired to AO channels (i.e., connected to AO field device terminals). The terminals of the FTA 194D similarly should serve as an interconnection between the DI card 156D and terminals 192 that are wired to DI field device terminals.

Of note, channel limitations associated with the dedicated traditional I/O cards 156 results in inefficient deployment of I/O cards and unused I/O channels, terminal blocks, and associated cabinet space in the marshalling cabinet 150. Because each of the I/O cards 156 only supports four channels, two AI cards 156A and 156B must be installed and connected to the controller 158, and two corresponding FTAs 194A and 194B must be utilized. For example, the FTA 194B includes three unused terminals and the I/O card 156B has three unused I/O channels due to the signal count requirements and the limitations of the dedicated I/O cards 156. This imperfect match between signal requirements for the field devices 152 and the limitations of the I/O cards 156 results in an inefficient deployment of the I/O cards 156. Despite the fact that the controller 158 is assigned 16 signals, the controller 158 requires six dedicated I/O cards. If the signal count were perfectly distributed by type, the controller 158 would only require four I/O cards. As previously noted, the EIOC network 7 does not suffer these problems with channel limitations because each EIOC can be linked to any suitable EIOC field device.

D. An Example EIOC Assembly 400 for the EIOC 126

Figure 4:
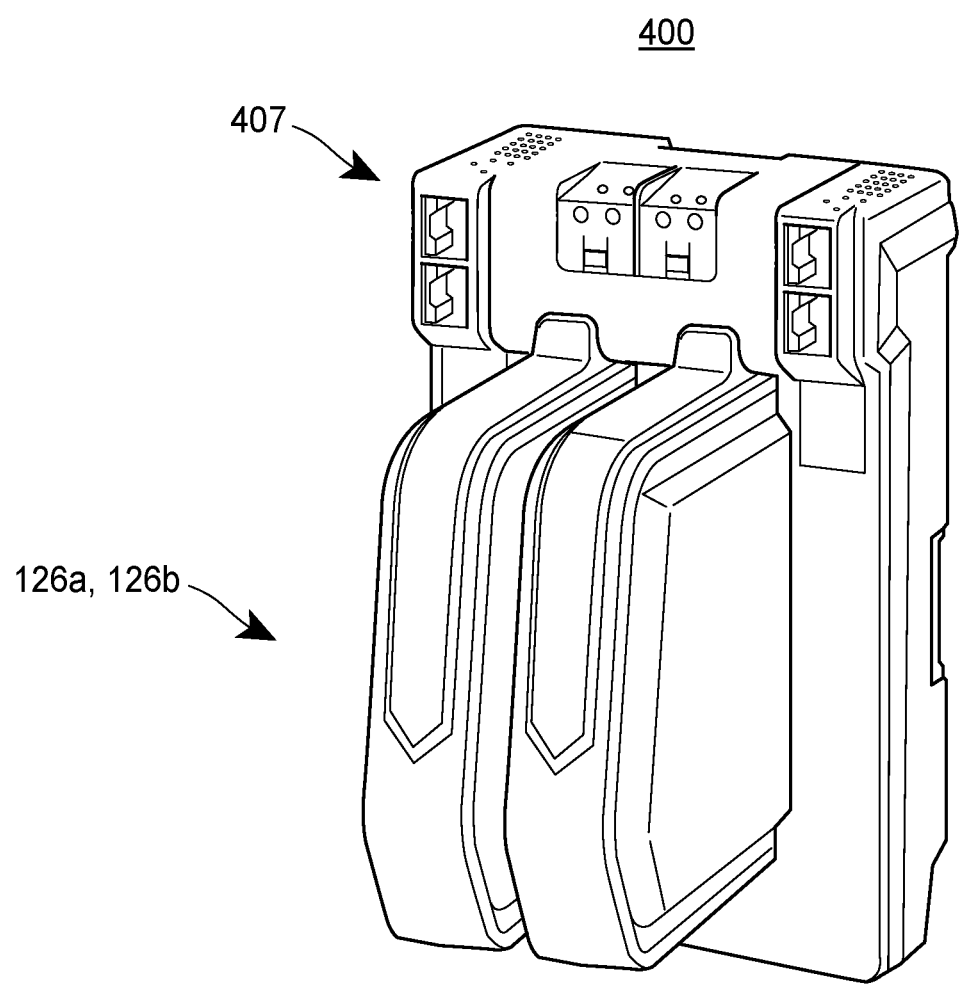
FIG. 4 is a perspective view of an EIOC assembly for the EIOC shown in FIG. 1A.

FIG. 4 is a perspective view of an EIOC assembly 400 for the EIOC 126 of the EIOC network 7 shown in FIGS. 1A and 1B. The assembly 400 may be mounted to a backplane including a communication bus or channel. The controller 111 may also be mounted to the backplane and may communicate with the EIOC 126 via the bus (e.g., the link 141 shown in FIG. 1A).

The assembly 400 includes EIOC connectors or terminals 407. A communication link (e.g., from a switch, router, or field device) to the EIOC 126 may be made by connecting a physical link (e.g., the links 142 shown in FIG. 1A or any suitable CATx or Ethernet cable) to one of the terminals 407. As shown, the terminals 407 are configured according to the RJ45 standard and may facilitate interconnection with any other cable or link having an RJ45 connector. Any one or more of the links 142-145 may be or include Ethernet links with RJ45 connectors for terminating at each end. Likewise, each of the field devices 131-135 and the switch 128 may facilitate connection to the links 142-145 via RJ45 connectors.

II. AN EXAMPLE METHOD 500 FOR FACILITATING CONFIGURATION OF A PROCESS CONTROL SYSTEM TO INTEGRATE AN EIOC FIELD DEVICE AND ASSOCIATED FIELD DEVICE VARIABLES

Figure 5:
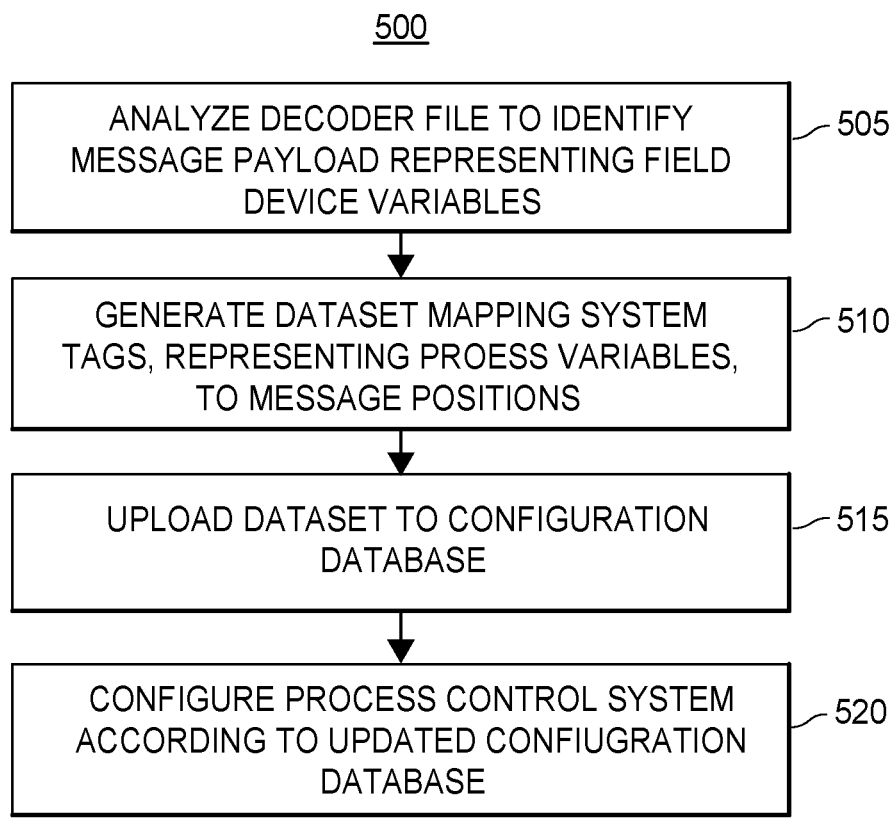
FIG. 5 is a flow chart for an example method for facilitating configuration of the process control system (shown in FIG. 1B) by way of the EIOC scanner (shown in FIG. 1A) based on an analysis of a decoder file for a field device.

FIG. 5 is a flow chart for an example method 500 for facilitating configuration of the process control system 5 by way of the decoder file 199 for the field device 131 and the EIOC scanner 75 (shown in FIG. 1A) to integrate, into the process control system 5, field device variables that the field device 131 is configured to transmit or receive. The method 500 may be implemented, in whole or in part, by the system(s) shown in FIG. 1A, and may be saved to a memory (e.g., of the EIOC scanner 75) as one or more instructions or routines. That said, it will also be understood that the method 500 may be implemented with respect to any suitable process control system, EIOC field device, decoder file, or EIOC scanner.

The method 500 begins at a step 505 when the scanner 75 analyzes the decoder file 199 to identify message positions mapped to field device variables for the field device 131 (for messages transmitted or received via the link 142). The positions may be offsets relative to a header or any suitable delimiter in messages on the link 142. For example, a first byte within a message may represent a first command or variable value for a first variable; a second byte within the message may represent a second command or variable value for a second variable; etc.

In embodiment, the decoder file 199 may specify any suitable technique for decoding field device variable values from messages transmitted to or from the field device 131. For example, in an embodiment, a form of time division multiplexing may be utilized. That is, the variable represented within a message or by a given message position may depend on which of a number of time slots is active (which may be determined from the decoder file 199). Of course, in such an embodiment, the EIOC 126 and the field device 131 may be clock-synchronized to coordinate appropriate messaging.

At a step 510, the scanner 75 generates a dataset mapping system tags, representing process variables, to message positions for field device variables the field device 131 is configured to read or write. Said another way, the dataset is generated to create process variables representing the same type of command (e.g., a desired valve position), measurement (e.g., a measured temperature), or parameter (e.g., a diagnostic parameter representing the status of the field device 131).

The set of field device variables identified in the decoder file 199 may include various types of variables, including: a default field device ID (which may be mapped to a PDT in the dataset); one or more field device signal variables representing particular commands or parameters to be received by the field device 131 or measurements or other parameters to be transmitted by the field device 131 (which may be mapped to DSTs in the dataset); or one or more group variables specifying logical groups of field device signal variables (which may be mapped to LDTs in the dataset).

If desired, the scanner 75 may present a user interface for manipulating the dataset mapping system tags to the field device variables. Example user interfaces are described below in more detail with reference to FIGS. 10-12. In short, the user may modify or specify various fields, such as a field indicating a node (e.g., a tag for a particular EIOC) to which the field device 131 is assigned (e.g., a tag unique to the EIOC 126 in this case); names for system tags; parameters associated with the system tags (such as type, message position, input vs output, etc.).

At a step 515, the scanner 75 uploads the dataset to the configuration system 72. The configuration system 72 stores the dataset to the configuration database 72b, thereby formally assigning the system tags for the process variables to the appropriate communication channels (e.g., the EIOC message positions associated with the field device 131).

At a step 520, the process control system 5 is configured according to the configuration system 72. This configuration process makes the new system tags associated with the field device 131 addressable (i.e., readable or writeable) by devices within the control system 5 (e.g., the controller 111, the EIOC 126, the other field devices 131-135 and 15-22; the data historian 73; etc.). As a result, control routines (e.g., 38, 200) implemented by controllers in the process control system 5 can reference the system tags to implement control of the process.

In some instances, the method 500 may be implemented to configure the process control system based on an updated decoder file for a field device already functional within the process control system. For example, a manufacturer or developer for an existing field device in the process control system may publish a new or updated decoder file for the field device (e.g., to account for new variables, updated variable characteristics, new functionality of the field device, new firmware, etc.). To gain any benefits or updates associated with the updated decoder file, the scanner 75 may analyze the updated decoder file and update the configuration system 72 accordingly.

III. EXAMPLE PROTOCOL STACKS 600-900 FOR THE EIOC NETWORK 7

FIGS. 6-9 depict example protocol stacks 600-900 for protocols that may be implemented by the EIOC network 7 and the EIOC 126. Simply put, as shown by the stacks 600-900, messages transmitted between EIOC 126 and the EIOC field devices 131-135 conform to one or more EIOC protocol stacks (e.g., the stacks 600, 800, or 909) in which messages conforming to typical process control standards or protocols are wrapped in a TCP/IP wrapper (e.g., Modbus TCP, CIP, EthernetIP).

Figure 6:
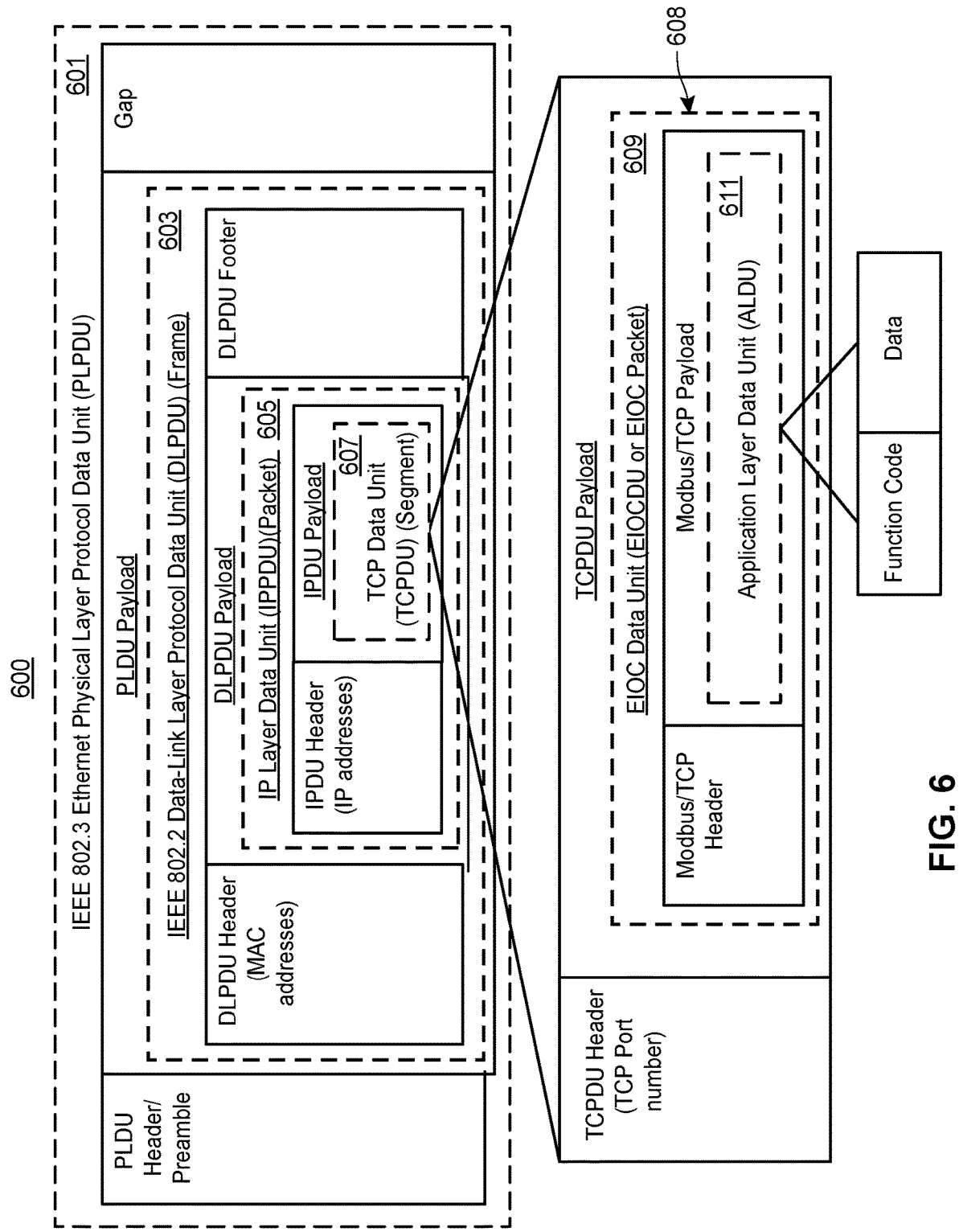
FIG. 6 depicts an example protocol stack, according to which the controllers and field devices shown in FIGS. 1A and 1B may communicate, that may be utilized to encapsulate process control messages, conforming to process control standards or protocols such as Modbus/TCP, within messages conforming to standard protocols selected from the Internet protocol suite.

FIG. 6 depicts an example protocol stack 600 that may be utilized to encapsulate process control messages, conforming to process control standards or protocols such as Modbus/TCP, within messages conforming to standard protocols selected from the Internet protocol suite.

The stack 600 includes layers 601-607 conforming to protocols from the Internet protocol suite: the IEEE 802.3 Ethernet protocol for the physical layer 601, the IEEE 802.2 protocol for the data-link layer 603, the Internet Protocol (IP) for the IP layer 605, and the Transmission Control Protocol (TCP) for the TCP layer 607.

The stack 600 also includes a protocol 608 (e.g., the Modbus/TCP protocol) for an intermediate layer 609 between the TCP layer 607 and the application layer 611. Generally speaking, messages transmitted according to the protocol 608 are Modbus messages transmitted within a TCP/IP wrapper and sent over a network. That is, the protocol 608 encapsulates data units (e.g., Modbus messages in this case) from the application layer 611 and adds metadata to create a data unit within the layer 609 that can then be encapsulated and transmitted according to a standard protocol from the Internet protocol suite (e.g., TCP, UDP).

FIG. 7 depicts function codes 701 commonly used for messages transmitted according to the protocol 608. These codes may be utilized by the EIOC 126 or any of the field devices 131-135 to read or write to any desired process control variable or parameter (e.g., a command for an actuator; a measurement of a temperature, flow, pressure, level, etc.; a diagnostic parameter; etc.).

Figure 8:
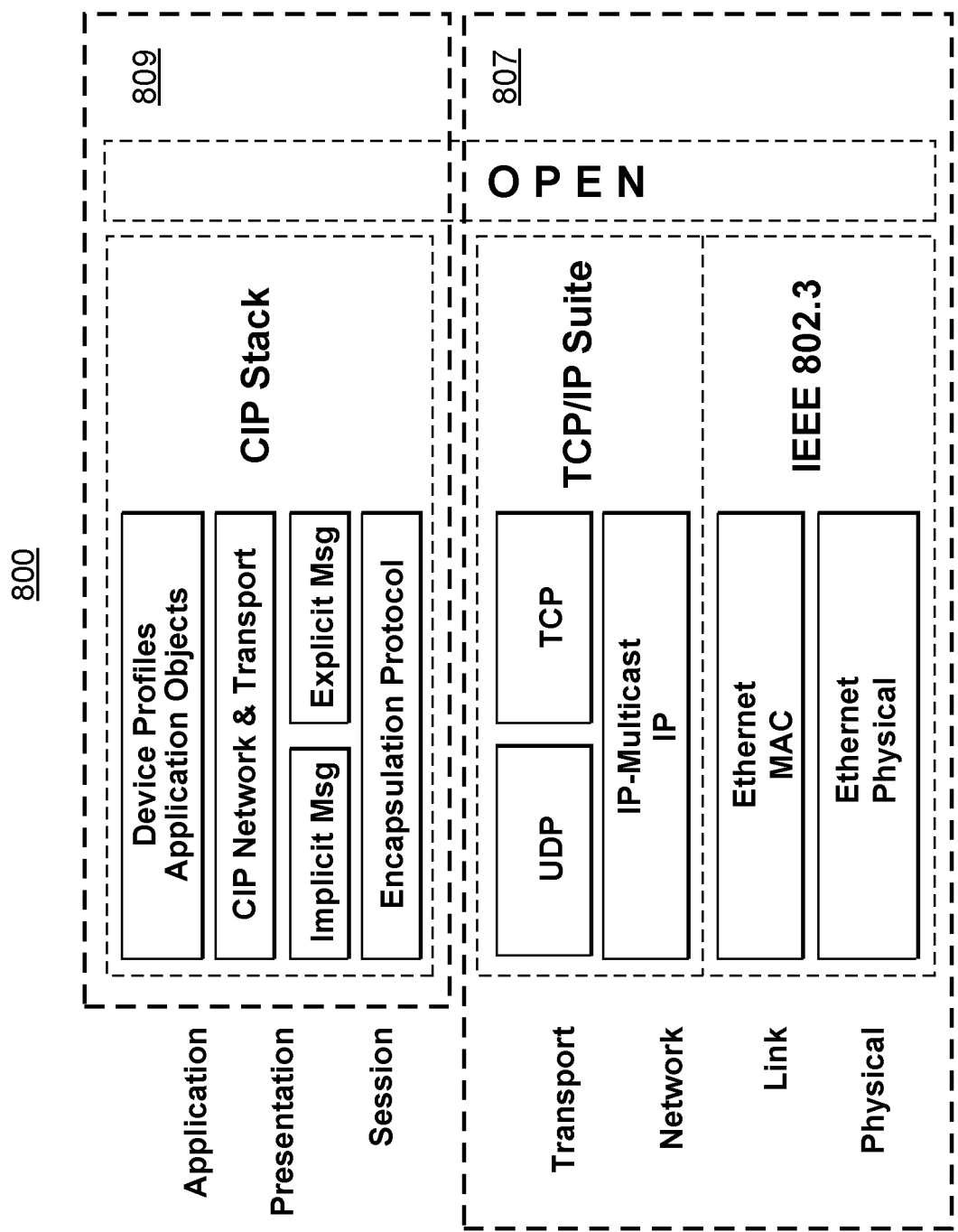
FIG. 8 is an example protocol stack, according to which the controllers and field devices shown in FIGS. 1A and 1B may communicate, including a Common Industrial Protocol (CIP) stack encapsulated within a typical TCP/IP or UDP/IP stack.

FIG. 8 is an example protocol stack 800 including a Common Industrial Protocol (CIP) stack 809 encapsulated within a typical TCP/IP or UDP/IP stack 807. Generally speaking, any reference herein to TCP/IP or the "TCP/IP stack" will be understood to reference UDP/IP as well. The EIOC 126 and the field devices 131-135 may transmit and receive messages according to the protocol stack 800.

The stack 809 represents a set of protocols within the stack 800 for process control communication that may be encapsulated within messages configured according to the typical TCP/IP stack 807. Generally speaking, the stack 809 encompasses a comprehensive suite of messages and services for automation applications. For instance, there are two types of message connections, implicit and explicit. Explicit message connections are point-to-point relations established to facilitate request-response transactions between two nodes. These connections use TCP/IP services to transmit messages in accordance with Ethernet standards. Implicit message connections may move specific application's I/O data at regular intervals. They may use the multicast producer-consumer model and UDP/IP services to transfer data over links conforming to Ethernet standards.

Figure 9:
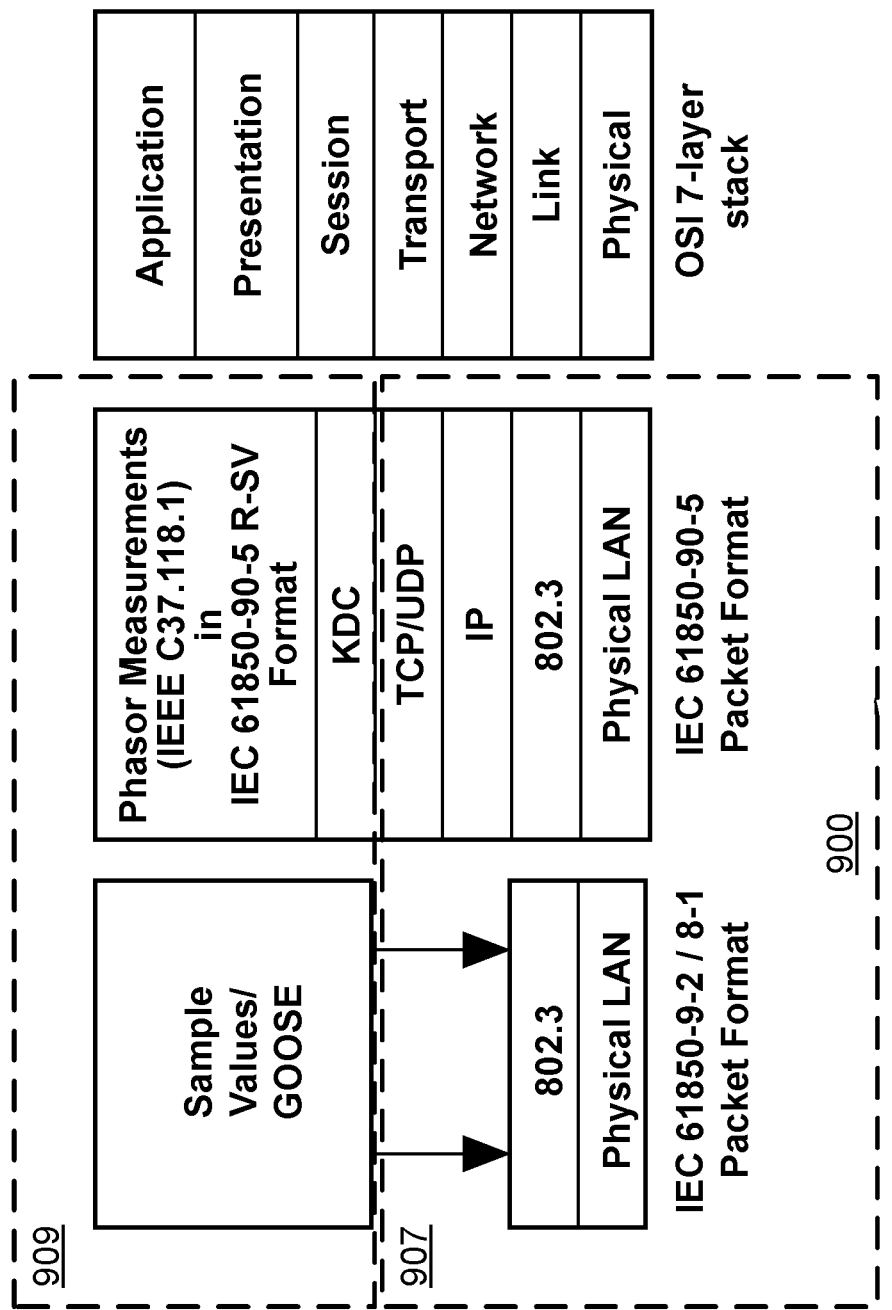
FIG. 9 is an example protocol stack, according to which the controllers and field devices shown in FIGS. 1A and 1B may communicate, including IEC 61850 stacks encapsulated within typical TCP/IP or TCP/UDP stacks.

FIG. 9 is an example protocol stack 900s including IEC 61850 stacks 909. Process control communications formatted according to the stacks 909 may be encapsulated within messages conforming to typical TCP/IP or TCP/UDP stacks 907. The EIOC 126 and the field devices 131-135 may transmit and receive messages according to the protocol stack 900.

Generally speaking, IEC 61850 is an international standard defining communication protocols for intelligent electronic devices at electrical substations. It is a part of the International Electrotechnical Commission's (IEC) Technical Committee 57 reference architecture for electric power systems. The abstract data models defined in IEC 61850 can be mapped to a number of protocols. Current mappings in the standard are to MMS (Manufacturing Message Specification), GOOSE (Generic Object-Oriented Substation Event), SMV (Sampled Measured Values), etc. These protocols can run over TCP/IP networks or substation LANs using high speed switched Ethernet.

In some embodiments, the EIOC 126 and field devices 131-135 may be configured to communicate with field devices via the HART-IP protocol, and may be configured to implement the method 500 utilizing HART-IP communications. That is, the EIOC scanner 75 may be configured to analyze a decoder file for a HART-IP field device and to facilitate configuration of the process control system 5 accordingly. In some embodiment, the EIOC 126 is not HART-IP compatible, and the EIOC scanner 75 may not be configured to facilitate integration of HART-IP field devices into the process control system 5.

IV. EXAMPLE UIS 1000-1200 THAT MAY BE PRESENTED BY THE EIOC SCANNER 75

Figure 10:
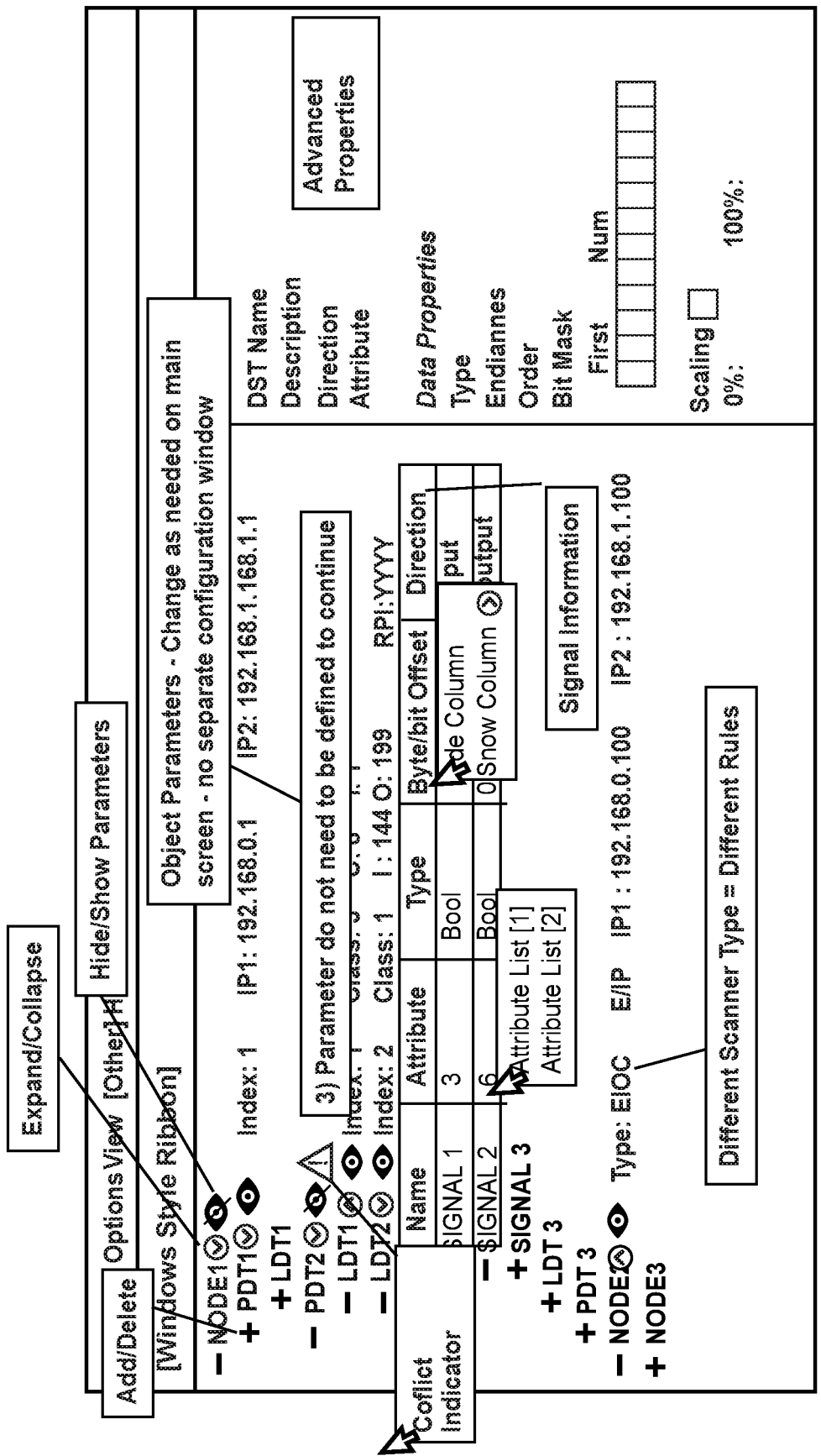
FIG. 10 shows a user interface that may be presented by the EIOC scanner shown in FIG. 1A to enable a user to add, edit, or view any of a number of system tags to be assigned to field device variables identified from the decoder file shown in FIG. 1A.
Figure 11:
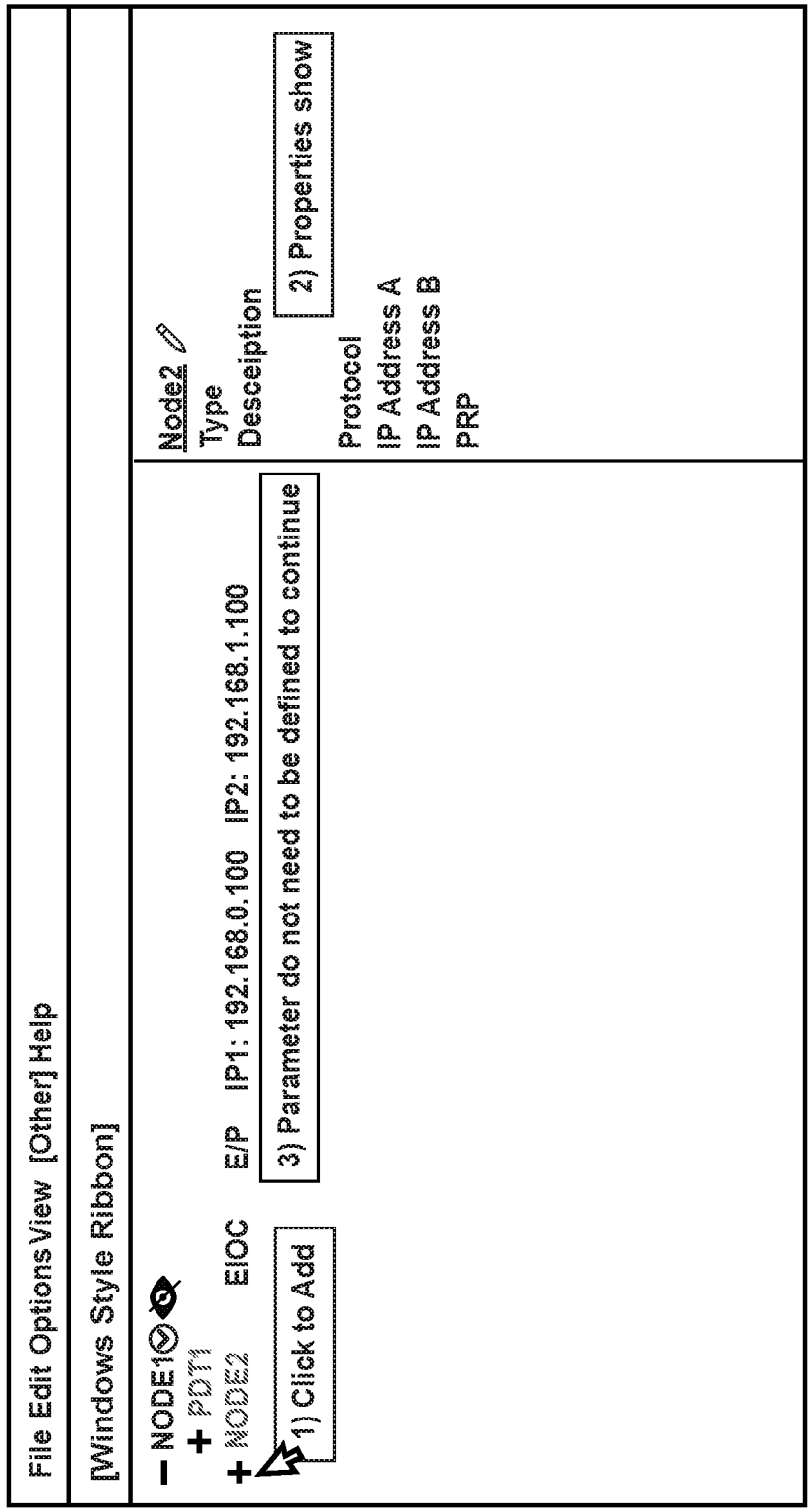
FIG. 11 shows a user interface that may be presented by the EIOC scanner shown in FIG. 1A to enable a user to add, edit, or view node tags (a type of system tag) for an EIOC associated with the variables imported from the decoder file.
Figure 12:
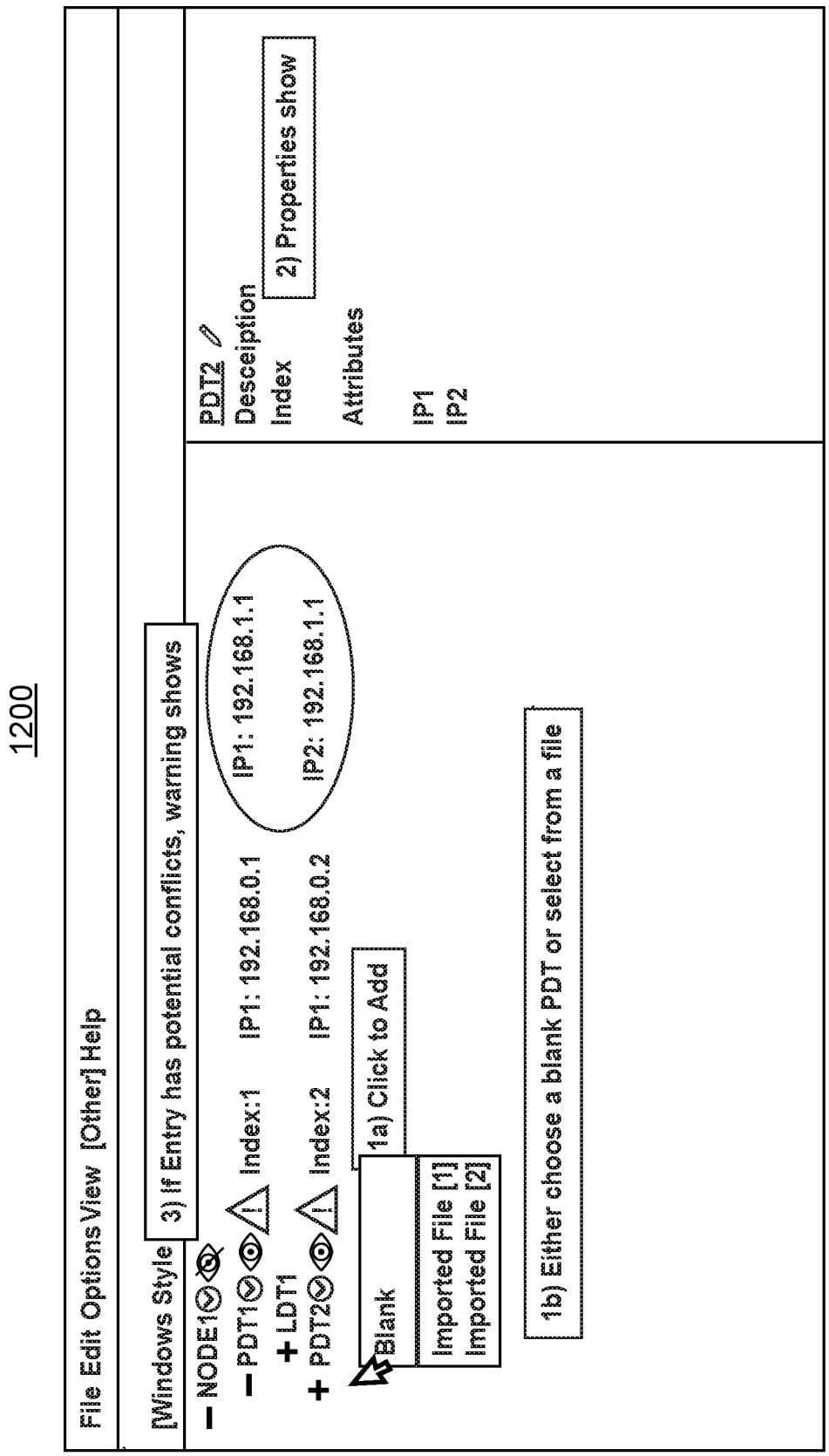
FIG. 12 shows a user interface that may be presented by the EIOC scanner shown in FIG. 1A to enable a user to add, edit, or view physical device tags (a type of system tag) to be associated with one or more variables imported from the decoder file.

FIGS. 10-12 depict example UIs 1000-1200 that may be presented by the EIOC scanner 75 to facilitate configuration of the process control system 5 based on the decoder file 199. The UIs 1000-1200 may be displayed by the scanner 75 after analyzing the decoder file 199, enabling a user to view or edit properties associated with systems tags and the field device variables being mapped to the system tags. As an example the user may utilize the UIs 1000-1200 to edit names and properties associated with PDTs, LDTs, DSTs, and nodes (each of which represents a system tag) being generated and mapped to field device variables associated with the field device 131.

In some instances, a user may utilize the UIs 1000-1200 to add I/O nodes (as previously noted, each node represents a particular EIOC). For example, as shown by the UI 1100 of FIG. 11, the user may then specify a name; type; protocol (e.g., CIP, IEC 61850, Modbus TCP, etc.) for which the node/EIOC should be configured; etc.

Before turning to the details of FIGS. 10-12, it should be noted that the phrase "user interface" or "UI" refers to components of a computer system by which a user interacts with the computer system. UI components may be hardware, software, or some combination thereof, and may include UI input components, UI output components, or some combination thereof. In some embodiments, any one or more of the UI components 104 shown in FIG. 1B may include any one or more of the example UI components listed below.

Example UI output components include: (i) visual output components such as lights (e.g., LEDs) and electronic displays (e.g., LCD, LED, CRT, plasma, projection displays, heads-up displays, etc.), (ii) audio output components such as speakers, and (iii) motion generating components such as motors that provide haptic feedback.

Example UI input components include: (i) mechanical or electrical components for detecting physical or touch input, such as hardware actuators (e.g., those used for a keyboard, a mouse, "hard" buttons found on a tablet or phone, etc.) or electrical sensors (e.g., resistive or capacitive touch sensors); (ii) audio sensors (e.g., microphones) for detecting audio input, such as voice commands; (iii) image sensors for detecting image or video input, such as those found in a camera (e.g., enabling facial recognition input or gesture input without requiring the user to touch the device); and (iv) motion sensors (e.g., accelerometers, gyroscopes, etc.) for detecting motion of the computer system itself (e.g., enabling a user to provide input by rotating or otherwise moving the computer system).

The EIOC scanner 75 may provide a graphical UI (GUI) by way of the display 107 of the UI 104. Generally speaking, a GUI is generated via a routine (e.g., the scanner tool 113) and enables a user to interact with indicators and other graphic elements displayed on at the electronic display. Generally speaking, the graphic elements of a GUI may be output elements (i.e., conveying some sort of information to the user), control elements (i.e., being user "interactable" to cause the execution of an action by the system), or both (e.g., an icon may include an image representing a browser and may be interacted with to launch the browser). Example GUI control elements include buttons (e.g., radio buttons, check boxes, etc.), sliders, list boxes, spinner elements, drop-down lists, menus, menu bars, toolbars, interactive icons, text boxes, windows that can be moved or minimized and maximized, etc.

Turning FIG. 10, the UI 1000 may be presented by the scanner 75 to enable a user to add, edit, or view any of a number of system tags (e.g., DSTs, PDTs, LDTs, node tags) to be assigned to field device variables identified from the decoder file 199 (e.g., each of which associated with a particular message position within EIOC messages transmitted or received by the field device 131).

As shown in FIG. 11, the scanner 75 may present the UI 1100 to enable a user to add, edit, or view node tags for an EIOC (e.g., a node tag unique to the EIOC 126) associated with the variables imported from the decoder file.

As shown in FIG. 12, the UI 1200 may be presented by the scanner 75 to enable a user to add, edit, or view PDTs to be associated with one or more variables imported from the decoder file 199. In some instances, the decoder file 199 includes a default field device ID or PDT, and the scanner 75 may populate the UI 1200 with the default PDT. In some instances, the user may wish to assign PDT different from the default value (e.g., if the default PDT is already assigned to device in the process control system 5, or if the default PDT does not conform to a naming standard associated with the process control system 5). As shown, the user may utilize the UI 1200 to specify a name, description, index, and various other attributes for each PDT.

V. ADDITIONAL CONSIDERATIONS

When implemented in software, any of the applications, services, and engines described herein may be stored in any tangible, non-transitory computer readable memory such as on a magnetic disk, a laser disk, solid state memory device, molecular memory storage device, or other storage medium, in a RAM or ROM of a computer or processor, etc. Although the example systems disclosed herein are disclosed as including, among other components, software or firmware executed on hardware, it should be noted that such systems are merely illustrative and should not be considered as limiting. For example, it is contemplated that any or all of these hardware, software, and firmware components could be embodied exclusively in hardware, exclusively in software, or in any combination of hardware and software. Accordingly, while the example systems described herein are described as being implemented in software executed on a processor of one or more computer devices, persons of ordinary skill in the art will readily appreciate that the examples provided are not the only way to implement such systems.

Referencing the method 500, the described functions may be implemented, in whole or in part, by the devices, circuits, or routines of the process control system 5 shown in FIG. 1B. The method 500 may be embodied by a set of circuits that are permanently or semi-permanently configured (e.g., an ASIC or FPGA) to perform logical functions of the respective method or that are at least temporarily configured (e.g., one or more processors and a set instructions or routines, representing the logical functions, saved to a memory) to perform the logical functions of the respective method.

While the present invention has been described with reference to specific examples, which are intended to be illustrative only and not to be limiting of the invention, it will be apparent to those of ordinary skill in the art that changes, certain additions or deletions may be made to the disclosed embodiments without departing from the spirit and scope of the invention. Further, although the forgoing text sets forth a detailed description of numerous different embodiments, it should be understood that the scope of the patent is defined by the words of the claims set forth at the end of this patent and their equivalents. The detailed description is to be construed as exemplary only and does not describe every possible embodiment because describing every possible embodiment would be impractical, if not impossible.

Throughout this specification, plural instances may implement components, operations, or structures described as a single instance. Although individual operations of one or more methods are illustrated and described as separate operations, one or more of the individual operations may be performed concurrently in certain embodiments.

As used herein, any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

Further, the phrase "wherein the system includes at least one of X, Y, or Z" means the system includes an X, a Y, a Z, or some combination thereof. Similarly, the phrase "wherein the component is configured for X, Y, or Z" means that the component is configured for X, configured for Y, configured for Z, or configured for some combination of X, Y, and Z.

In addition, use of the "a" or "an" are employed to describe elements and components of the embodiments herein. This description, and the claims that follow, should be read to include one or at least one. The singular also includes the plural unless it is obvious that it is meant otherwise.

Further, the patent claims at the end of this document are not intended to be construed under 35 U.S.C. § 112(f) unless traditional means-plus-function language is expressly recited, such as "means for" or "step for" language being explicitly recited in the claim(s). At least some aspects of the systems and methods described herein are directed to an improvement to computer functionality, and improve the functioning of conventional computers.

VI. TERMS AND PHRASES

Throughout this specification, some of the following terms and phrases are used.

Communication Protocols. In this description, communication protocols, standards, and technologies may be referred to generically as "communication protocols." Example communication protocols, standards, or technologies that may be utilized by the described systems include those that facilitate communication via nanoscale networks, near-field networks, personal area networks ("PANs"), local area networks ("LANs"), backbone networks, metropolitan area networks ("MANs"), wide area networks ("WANs"), Internet area networks ("IANs"), or the Internet.

Example near-field network protocols and standards include typical radio-frequency identification ("RFID") standards or protocols and near-field communication ("NFC") protocols or standards. Example PAN protocols and standards include 6LoWPAN, Bluetooth (i.e., a wireless standard for exchanging data between two devices using radio waves in the range of approximately 2.4 to 2.485 GHz), IEEE 802.15.4-2006, ZigBee, the Thread protocol, ultra-wideband ("UWB"), universal serial bus ("USB") and wireless USB, and ANT+. Example LAN protocols and standards include the 802.11 protocol and other high frequency protocols/systems for wireless communication in bands found in a range of approximately 1 GHz-60 GHz (e.g., including the 900 MHz, 2.4 GHz, 3.6 GHz, 5 GHz, or 60 GHz bands), as well as standards for suitable cabling such as coaxial and fiber-optic cabling. Example technologies used to facilitate wireless WANs includes those used for LANs, as well as 2G (e.g., GPRS and EDGE), 3G (e.g., UMTS and CDMA2000), 4G (e.g., LTE and WiMax), and 5G (e.g., IMT-2020) technologies. Note, the Internet may be considered a WAN.

Other communication protocols and standards that may be utilized include BitTorrent, Bluetooth Bootstrap Protocol ("BOOTP"), Domain Name System ("DNS"), Dynamic Host Configuration Protocol ("DHCP"), Ethernet, file transfer protocol ("FTP"), hypertext transfer protocol ("HTTP"), infrared communication standards (e.g., IrDA or IrSimple), transmission control protocol/internet protocol ("TCP/IP") (e.g., any of the protocols used in each of the TCP/IP layers), real-time transport protocol ("RTP"), real-time streaming protocol ("RTSP"), Simple Mail Transfer Protocol ("SMTP"), Simple Network Management Protocol ("SNMP"), Simple Network Time Protocol ("SNTP"), secure shell protocol ("SSH"), and any other communications protocol or standard, or any combination thereof.

Communication Link. Unless otherwise stated, a "communication link" or a "link" is a pathway or medium connecting two or more nodes. A link may be a physical link or a logical link. A physical link is the interface or medium(s) over which information is transferred, and may be wired or wireless in nature. Example physicals links include (i) wired links such as cables with a conductor for transmission of electrical energy or a fiber optic connections for transmission of light and (ii) wireless links such as wireless electromagnetic signals that carry information via changes made to one or more properties of electromagnetic waves.

As noted, a wireless link may be a wireless electromagnetic signal that carries information via changes made to one or more properties of an electromagnetic wave(s). A wireless electromagnetic signal may be a microwave or radio wave and may be referred to as a radio frequency or "RF" signal. Unless otherwise stated, described RF signals may oscillated at a frequency within any one or more bands found in the spectrum of roughly 30 kHz to 3,000 GHz (e.g., an 802.11 signal in the 2.4 GHz band). Example RF bands include the low frequency ("LF") band at 30-300 kHz, the medium frequency ("MF") band at 300-3,000 kHz, the high frequency ("HF") band at 3-30 MHz, the very high frequency ("VHF") band at 30-300 MHz, the ultra-high frequency ("UHF") band at 300-3,000 MHz, the super high frequency ("SHF") band at 3-30 GHz, the extremely high frequency ("SHF") band at 30-300 GHz, and the tremendously high frequency ("THF") band at 300-3,000 GHz.

A logical link between two or more nodes represents an abstraction of the underlying physical links or intermediary nodes connecting the two or more nodes. For example, two or more nodes may be logically coupled via a logical link. The logical link may be established via any combination of physical links and intermediary nodes (e.g., routers, switches, or other networking equipment).

A link is sometimes referred to as a "communication channel." In a wireless communication system, the term "communication channel" (or just "channel") generally refers to a particular frequency or frequency band. A carrier signal (or carrier wave) may be transmitted at the particular frequency or within the particular frequency band of the channel. In some instances, multiple signals may be transmitted over a single band/channel. For example, signals may sometimes be simultaneously transmitted over a single band/channel via different sub-bands or sub-channels. As another example, signals may sometimes be transmitted via the same band by allocating time slots over which respective transmitters and receivers use the band in question.

Computer. Generally speaking, a computer or computing device is a programmable machine having two principal characteristics. Namely, it responds to a set of instructions in a well-defined manner and can execute a prerecorded list of instructions (e.g., a program or routine). A computer according to the present disclosure is a device with a processor and a memory. For purposes of this disclosure, examples of a computer include a server host, a personal computer, (e.g., desktop computer, laptop computer, netbook), a mobile communications device (such as a mobile "smart" phone), and devices providing functionality through internal components or connection to an external computer, server, or global communications network (such as the Internet) to take direction from or engage in processes which are then delivered to other system components.

Database. Generally speaking, a "database" is an organized collection of data, generally stored and accessed electronically from a computer system. Generally, any suitable datastore may be referred to as a "database." This disclosure may describe one or more databases for storing information relating to aspects of the disclosure. The information stored on a database can, for example, be related to a private subscriber, a content provider, a host, a security provider, etc. A server (which may or may not be hosted on the same computer as the database) may act as an intermediary between the database and a client by providing data from the database to the client or enabling the client to write data to the database. One of ordinary skill in the art appreciates any reference to "a database" may refer to multiple databases, each of which may be linked to one another.

Display Device. Generally speaking, the terms "display device" or "display" refer to an electronic visual display device that provides visual output in the form of images, text, or video. In some embodiments, the described display devices (e.g., X, Y, Z) may be any display, screen, monitor, or projector suitable for displaying visual output (e.g., images or video output). Example displays include LED screens, LCD screens, CRT screens, projectors, heads up displays, smart watch displays, headset displays (e.g., VR goggles), etc.

Memory and Computer-Readable Media. Generally speaking, as used herein the phrase "memory" or "memory device" refers to a system or device including computer-readable media or medium ("CRM"). "CRM" refers to a medium or media accessible by the relevant computing system for placing, keeping, or retrieving information (e.g., data, computer-readable instructions, program modules, applications, routines, etc.). Note, "CRM" refers to media that is non-transitory in nature, and does not refer to disembodied transitory signals, such as radio waves.

The CRM may be implemented in any technology, device, or group of devices included in the relevant computing system or in communication with the relevant computing system. The CRM may include volatile or nonvolatile media, and removable or non-removable media. The CRM may include, but is not limited to, RAM, ROM, EEPROM, flash memory, or other memory technology, CD-ROM, digital versatile disks (DVD) or other optical disk storage, magnetic cassettes, magnetic tape, magnetic disk storage or other magnetic storage devices, or any other medium which can be used to store information and which can be accessed by the computing system. The CRM may be communicatively coupled to a system bus, enabling communication between the CRM and other systems or components coupled to the system bus. In some implementations the CRM may be coupled to the system bus via a memory interface (e.g., a memory controller). A memory interface is circuitry that manages the flow of data between the CRM and the system bus.

Message. When used in the context of communication networks, the term "message" refers to a unit of communication, represented by a set of data, transmitted or received by a node (e.g., via a link). The set of data representing the message may include a payload (i.e., the content intended to be delivered) and protocol overhead. The overhead may include routing information and metadata pertaining to the protocol or payload (e.g., identifying the protocol for the message, the intended recipient node, the originating node, the size of the message or payload, data integrity information for checking the integrity of the message, etc.). In some instances, a packet or sequence of packets may be thought of as a message.

Module. When used in the context of a software system, the term "module" generally refers to a set of applications, routines, or executable instructions. See "Routine." In some instances, the term "module" refers to a component of a physical system (e.g., a car includes a number of modules, such as an engine, transmission, brakes, etc.). The context of the use of the term will make clear whether the "module" refers to a software component or non-software component.

Network. As used herein and unless otherwise specified, when used in the context of system(s) or device(s) that communicate information or data, the term "network" (e.g., the network or backbone 10 shown in FIG. 1B) refers to a collection of nodes (e.g., devices or systems capable of sending, receiving or forwarding information) and links which are connected to enable telecommunication between the nodes.

Depending on the embodiment (and unless otherwise stated), each of the described networks may include dedicated routers, switches, or hubs responsible for forwarding directing traffic between nodes, and, optionally, dedicated devices responsible for configuring and managing the network. Some or all of the nodes in the described networks may be also adapted to function as routers in order to direct traffic sent between other network devices. Nodes of the described networks may be inter-connected in a wired or wireless manner, and may have different routing and transfer capabilities. If desired, each described network may include networks or sub-networks, such as a personal area network (PAN), a local area network (LAN), or a wide area network (WAN).

Node. Generally speaking, the term "node" refers to a connection point, redistribution point, or a communication endpoint. A node may be any device or system (e.g., a computer system) capable of sending, receiving or forwarding information. For example, end-devices or end-systems that originate or ultimately receive a message are nodes. Intermediary devices that receive and forward the message (e.g., between two end-devices) are also generally considered to be "nodes."

Processor. The various operations of example methods described herein may be performed, at least partially, by one or more described or implicitly disclosed controllers or processors (e.g., the processor 102 shown in FIG. 1A). Generally speaking, the terms "processor" and "microprocessor" are used interchangeably, each referring to a computer processor configured to fetch and execute instructions stored to memory.

By executing these instructions, the disclosed processor (s) can carry out various operations or functions defined by the instructions. The disclosed processor(s) may be temporarily configured (e.g., by instructions or software) or permanently configured to perform the relevant operations or functions (e.g., a processor for an Application Specific Integrated Circuit, or ASIC), depending on the particular embodiment. Each disclosed processor may be part of a chipset, which may also include, for example, a memory controller or an I/O controller. A chipset is a collection of electronic components in an integrated circuit that is typically configured to provide I/O and memory management functions as well as a plurality of general purpose or special purpose registers, timers, etc. Generally speaking, one or more of the described processors may be communicatively coupled to other components (such as memory devices and I/O devices) via a system bus.

The performance of certain of the operations may be distributed among the one or more processors, not only residing within a single machine, but deployed across a number of machines. For example, when a single processor is described as performing a set of operations, it is understood that multiple processors may perform the set of operations in some embodiments according to any desired distribution across the multiple processors. In some example embodiments, the processor or processors may be located in a single location (e.g., within a home environment, an office environment or as a server farm), while in other embodiments the processors may be distributed across a number of locations.

Words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

Routine. Unless otherwise noted, a "routine," "module," or "application" described in this disclosure refers to a set of computer-readable instructions that may be stored on a CRM. For example, the scanner tool 113 is a routine that may be stored on a CRM. Generally, a CRM stores computer-readable code ("code") representing or corresponding to the instructions, and the code is adapted to be executed by a processor to facilitate the functions described as being represented by or associated with the routine or application. Each routine or application may be implemented via a stand-alone executable file, a suite or bundle of executable files, one or more non-executable files utilized by an executable file or program, or some combination thereof. In some instances, unless otherwise stated, one or more of the described routines may be hard-coded into one or more EPROMs, EEPROMs, application specific integrated circuits (ASICs), field programmable gate arrays (FPGAs), or any other hardware or firmware elements.

Further, unless otherwise stated, each routine or application may be embodied as: (i) a stand-alone software program, (ii) a module or sub-module of a software program, (iii) a routine or sub-routine of a software program, or (iv) a resource invoked or accessed by a software program via a "call" to thereby cause the system to implement the task or function associated with the resource.

Each described routine may be represented by code implemented in any desired language, such as source code (e.g., interpretable for execution or compilable into a lower level code), object code, bytecode, machine code, microcode, or the like. The code may be written in any suitable programming or scripting language (e.g., C, C++, Java, Actionscript, Objective-C, Javascript, CSS, Python, XML, Swift, Ruby, Elixir, Rust, Scala, or others).

Server. Generally speaking, a server is a program or set of routines that manages network resources or services to provide functionality for other programs or devices called "clients." Servers are typically hosted by a host computer, and this host computer may itself be referred to as a "server." Example servers include database servers, file servers, mail servers, print servers, web servers, game servers, and application servers. Servers may be dedicated (e.g., wherein the software and hardware are used exclusively or nearly exclusively for server functions) or virtual (e.g., wherein the server is hosted by a virtual machine on a physical machine and/or wherein the server shares hardware or software resources of a single machine with another operating system).

What is claimed is:

1. An electronic device for configuring an ethernet I/O card in a process control environment, including:
    a processor;
    a communication interface coupled to the processor; and
    a memory coupled to the processor storing instructions that, when executed by the processor, cause the processor to:
    (i) analyze a decoder file, for a field device configured to be coupled via an ethernet link to an ethernet I/O card (EIOC) in a process control system, mapping one or more field device variables to one or more message positions;
    (ii) generate a dataset including one or more device signal tags (DSTs), each representing a process variable corresponding to a different one of the one or more field device variables, mapped to the one or more message positions;
    (iii) upload, via the communication interface, the dataset to a configuration database for the process control system to include the dataset so that, when the process control system is configured according to the configuration database, the one or more DSTs correspond to the one or more message positions such that the EIOC is configured to:
        (a) implement a controller output handling function in which the EIOC is configured to: (1) receive, from a process controller, a controller output message including a controller output value for a first DST, and (2) respond by assigning the controller output value to a first message position mapped, according to the dataset, to the first DST, such that the controller output value is transmitted from the EIOC to the field device at the first message position for a field device input message transmitted to the field device; or
        (b) implement a controller input handling function in which the EIOC is configured to: (1) receive, from the field device, a field device output message including a controller input value at a second message position that is mapped, according to the dataset, to a second DST, and (2) respond by assigning the controller input value to the second DST, such that the input value is transmitted from the EIOC to the process controller as a value for the second DST as part of a controller input message.

2. The electronic device of claim 1, wherein the EIOC is configured to implement both the controller output handling function and the controller input handling function.

3. The electronic device of claim 1, wherein the EIOC and the field device are configured to transmit the field device input message and the controller input message in a time coordinated manner such that each is transmitted during a different predetermined time slot.

4. The electronic device of claim 1, wherein each of the controller output message and the controller input message is configured to carry multiple parameter values.

5. The electronic device of claim 1, wherein the dataset further includes one or more logical device tags (LDTs) mapped to a second one or more message positions.

6. The electronic device of claim 1, wherein the dataset further includes one or more physical device tags mapped to a second one or more message positions.

7. The electronic device of claim 1, wherein the instructions further cause the processor to generate and display, via a display of the electronic device, a user interface for viewing or editing the dataset including the one or more DSTs mapped to the one or more message positions.

8. The electronic device of claim 1, wherein the user interface includes a field for specifying a node tag, unique to the EIOC, to be associated with the dataset.

9. The electronic device of claim 1, wherein the instructions further cause the processor to download the decoder file from a server associated with the field device before analyzing the decoder file.

10. The electronic device of claim 1, wherein the instructions further cause the processor to download the decoder file from the field device before analyzing the decoder file.

11. A method for configuring an ethernet I/O card in a process control environment, including:
    (i) analyzing, by an electronic device, a decoder file for a field device configured to be coupled via an ethernet link to an ethernet I/O card (EIOC) in a process control system, mapping one or more field device variables to one or more message positions;
    (ii) generating, by the electronic device, a dataset including one or more device signal tags (DSTs), each representing a process variable corresponding to a different one of the one or more field device variables, mapped to the one or more message positions;
    (iii) uploading the dataset to a configuration database for the process control system to include the dataset so that, when the process control system is configured according to the configuration database, the one or more DSTs correspond to the one or more message positions such that the EIOC is configured to:
        (a) implement a controller output handling function in which the EIOC is configured to: (1) receive, from a process controller, a controller output message including a controller output value for a first DST, and (2) respond by assigning the controller output value to a first message position mapped, by the dataset, to the first DST, such that the controller output value is transmitted from the EIOC to the field device at the first message position for an EIOC input message transmitted to the field device; or (b) implement a controller input handling function in which the EIOC is configured to: (1) receive, from the field device, an EIOC output message including a controller input value at a second message position that is mapped, by the dataset, to a second DST, and (2) respond by assigning the controller input value to the second DST, such that the input value is transmitted from the EIOC to the process controller as a value for the second DST as part of a controller input message.

12. The method of claim 11, wherein the EIOC is configured to implement both the controller output handling function and the controller input handling function.

13. The method of claim 11, wherein the EIOC and the field device are configured to transmit the EIOC output message and the controller output message in a time coordinated manner such that each is transmitted during different a predetermined time slot.

14. The method of claim 11, wherein each of the controller output message and the controller input message is configured to carry multiple parameter values.

15. The method of claim 11, wherein the dataset further includes one or more logical device tags (LDTs) mapped to a second one or more message positions.

16. The method of claim 11, wherein the dataset further includes one or more physical device tags mapped to a second one or more message positions.

17. The method of claim 11, further comprising generating and displaying, at the electronic device, a user interface for viewing or editing the dataset including the one or more DSTs mapped to the one or more message positions.

18. The method of claim 17, wherein the user interface includes a field for specifying a node tag, unique to the EIOC, to be associated with the dataset.

19. The method of claim 11, further comprising downloading the decoder file from a server associated with the field device before analyzing the decoder file.

20. The method of claim 11, wherein further comprising downloading the decoder file from the field device before analyzing the decoder file.

* * * * *

UNITED STATES PATENT AND TRADEMARK OFFICE
CERTIFICATE OF CORRECTION

Page 1 of 2

PATENT NO. : 11,347,208 B2
APPLICATION NO. : 16/861567
DATED : May 31, 2022
INVENTOR(S) : Camilo Fadul et al.

It is certified that error appears in the above-identified patent and that said Letters Patent is hereby corrected as shown below:

On the Title Page

At page 2, in Column 2, item (56), under "OTHER PUBLICATIONS", Line 11, "queue" should be -- queue_ --.

In the Drawings

At Fig. 2, Sheet 3 of 13, Tag "208", "AOBlock" should be -- AO Block --.

At Fig. 2, Sheet 3 of 13, under "Legend", Line 2, "AI" should be -- AO --.

At Fig. 7, Sheet 8 of 13, Tag "701", Line 14, "Flle" should be -- File --.

At Fig. 7, Sheet 8 of 13, Tag "701", Line 15, "Flle" should be -- File --.

At Fig. 10, Sheet 11 of 13, "Coflict" should be -- Conflict --.

At Fig. 11, Sheet 12 of 13, Line 5, "Desceiption" should be -- Description --.

At Fig. 12, Sheet 13 of 13, Line 4, "Desceiption" should be -- Description --.

In the Specification

At Column 7, Line 8, "an" should be -- to an --.

At Column 7, Line 10, "to standard" should be -- standard --.

At Column 7, Line 32, "CATX" should be -- CatX --.

Signed and Sealed this
Twenty-fifth Day of November, 2025

John A. Squires
*Director of the United States Patent and Trademark Office*

CERTIFICATE OF CORRECTION (continued)
U.S. Pat. No. 11,347,208 B2

At Column 7, Line 32, "CAT5" should be -- Cat5 --.

At Column 7, Line 32, "CAT6)," should be -- Cat6), --.

At Column 7, Line 56, "signals)," should be -- signals"), --.

At Column 11, Line 7, "controller 11." should be -- controller 11). --.

At Column 16, Line 38, "Radio communication" should be -- Radiocommunication --.

At Column 17, Line 28, "in" should be -- an --.

At Column 17, Line 62, "and or" should be -- and/or --.

At Column 19, Line 7, "DT" should be -- DST --.

At Column 20, Line 45, "process" should be -- process that --.

At Column 21, Line 15, "with in" should be -- within --.

At Column 22, Line 25, "terminal)" should be -- terminal). --.

At Column 23, Line 37, "In" should be -- In an --.

At Column 26, Line 56, "on at" should be -- on --.

At Column 32, Line 32, "certain of the" should be -- certain --.

In the Claims

At Column 35, Line 24, "a predetermined" should be -- predetermined a --.